(12) United States Patent
O'Hern et al.

(10) Patent No.: US 12,441,541 B2
(45) Date of Patent: Oct. 14, 2025

(54) ROBOTIC PUT WALL SYSTEMS AND METHODS WITH MOBILE DESTINATION LOCATION ASSEMBLIES

(71) Applicant: Berkshire Grey Operating Company, Inc., Bedford, MA (US)

(72) Inventors: Ryan O'Hern, Reading, MA (US); Joseph Romano, Arlington, MA (US); Craig Hattabaugh, Wellesley, MA (US); John Richard Amend, Jr., Arlington, MA (US); Jacob Torrey, Tyngsboro, MA (US); Jeffrey Kittredge, Lexington, MA (US); Sara Laprade, Boston, MA (US); Sarah Myers, Boston, MA (US); Joshua Best, Raleigh, NC (US); Christopher Buck, Stow, MA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 231 days.

(21) Appl. No.: 17/965,420

(22) Filed: Oct. 13, 2022

(65) Prior Publication Data

US 2023/0112778 A1    Apr. 13, 2023

Related U.S. Application Data

(60) Provisional application No. 63/255,215, filed on Oct. 13, 2021.

(51) Int. Cl.
*B65G 1/127* (2006.01)
*B65G 1/06* (2006.01)

(52) U.S. Cl.
CPC ............... *B65G 1/127* (2013.01); *B65G 1/06* (2013.01); *B65G 2814/027* (2013.01)

(58) Field of Classification Search
CPC . B65G 1/127; B65G 1/08; B65G 1/10; B65G 1/1373; B65G 1/0407;
(Continued)

(56) References Cited

U.S. PATENT DOCUMENTS 3,750,804 A * 8/1973 Lemelson ........... G07F 11/1657
414/280
3,951,276 A * 4/1976 Moses ...................... B65G 1/08
414/607

(Continued)

FOREIGN PATENT DOCUMENTS

CA    3043018 A1    5/2018
CA    3057334 A1    9/2018
(Continued)

OTHER PUBLICATIONS

Communication pursuant to Rules 161(1) and 162 EPC issued by the European Patent Office in related European Patent Application No. 22727547.6 on Dec. 14, 2023, 3 pages.
(Continued)

*Primary Examiner* — Glenn F Myers
(74) *Attorney, Agent, or Firm* — Gesmer Updegrove LLP

(57) ABSTRACT

An object processing system is disclosed that includes an object induction station at which objects are provided for processing. The object induction station includes at least one perception unit for providing perception data regarding an object, and an object processing system for receiving objects from the object induction station, and for urging an object into a first end of one of a plurality of chute location, each of which including a first end that is accessible by the carrier and a second end that is accessible by a mobile destination container of a plurality of mobile destination containers.

21 Claims, 20 Drawing Sheets

(58) Field of Classification Search
CPC .. B65G 2814/027; B65G 47/50; B65G 47/96;
B65G 47/44; B65G 2203/0216; B65G
2203/0208; B65G 2203/044; B65G 43/08;
B65G 43/10; B65G 47/46; B65G 47/48;
B65G 47/5104; B65G 47/5109; B65G
2203/0225; B65G 1/0421; B65G 51/36;
B65G 51/30; B65G 51/40; B65G 51/42;
B65G 51/46; B07C 5/36; B07C 5/02;
G01V 8/20
See application file for complete search history.

(56) References Cited

U.S. PATENT DOCUMENTS

| | | | |
|---|---|---|---|
| 4,307,988 A * | 12/1981 | Page | B65G 1/08 198/465.4 |
| 4,542,808 A | 9/1985 | Lloyd, Jr. et al. | |
| 4,622,875 A | 11/1986 | Emery et al. | |
| 4,678,390 A | 7/1987 | Bonneton et al. | |
| 4,722,653 A | 2/1988 | Williams et al. | |
| 4,815,582 A | 3/1989 | Canziani | |
| 4,846,335 A | 7/1989 | Hartlepp | |
| 4,895,242 A | 1/1990 | Michel | |
| 5,190,162 A | 3/1993 | Harlepp | |
| 5,271,703 A | 12/1993 | Lindqvist et al. | |
| 5,595,263 A | 1/1997 | Pignataro | |
| 5,647,473 A | 7/1997 | Miller et al. | |
| 5,794,789 A | 8/1998 | Payson et al. | |
| 5,875,434 A | 2/1999 | Matsuoka et al. | |
| 6,006,946 A | 12/1999 | Williams et al. | |
| 6,076,023 A | 6/2000 | Sato | |
| 6,189,702 B1 | 2/2001 | Bonnet | |
| 6,208,908 B1 | 3/2001 | Boyd et al. | |
| 6,246,023 B1 | 6/2001 | Kugle | |
| 6,377,867 B1 | 4/2002 | Bradley et al. | |
| 6,505,093 B1 | 1/2003 | Thatcher et al. | |
| 6,513,641 B1 | 2/2003 | Affaticati et al. | |
| 6,688,459 B1 | 2/2004 | Bonham et al. | |
| 6,705,528 B2 | 3/2004 | Good et al. | |
| 6,762,382 B1 | 7/2004 | Danelski | |
| 7,861,844 B2 | 1/2011 | Hayduchok et al. | |
| 8,718,814 B1 | 5/2014 | Clark et al. | |
| 8,776,694 B2 | 7/2014 | Rosenwinkel et al. | |
| 8,798,784 B1 | 8/2014 | Clark et al. | |
| 8,851,272 B1 | 10/2014 | Hill | |
| 9,020,632 B2 | 4/2015 | Naylor | |
| 9,272,845 B2 | 3/2016 | Honkanen et al. | |
| 9,364,865 B2 | 6/2016 | Kim | |
| 9,481,518 B2 | 11/2016 | Neiser | |
| 9,694,977 B2 | 7/2017 | Aprea et al. | |
| 9,937,532 B2 | 4/2018 | Wagner et al. | |
| 9,975,148 B2 | 5/2018 | Zhu et al. | |
| 10,007,827 B2 | 6/2018 | Wagner et al. | |
| 10,029,865 B1 | 7/2018 | McCalib, Jr. et al. | |
| 10,086,998 B1 | 10/2018 | Tilekar et al. | |
| 10,438,034 B2 | 10/2019 | Wagner et al. | |
| 10,518,974 B2 | 12/2019 | Lee et al. | |
| 10,577,180 B1 | 3/2020 | Mehta et al. | |
| 10,596,696 B2 | 3/2020 | Wagner et al. | |
| 10,632,610 B2 | 4/2020 | Wagner et al. | |
| 10,649,445 B2 | 5/2020 | Wagner et al. | |
| 10,730,077 B2 | 8/2020 | Wagner et al. | |
| 10,843,333 B2 | 11/2020 | Wagner et al. | |
| 10,894,674 B2 | 1/2021 | Wagner et al. | |
| 10,906,740 B2 | 2/2021 | Wagner et al. | |
| 11,020,770 B1 | 6/2021 | Tilekar et al. | |
| 11,338,999 B2 | 5/2022 | Hu | |
| 11,472,633 B2 | 10/2022 | Wagner et al. | |
| 2002/0091801 A1 | 7/2002 | Lewin et al. | |
| 2002/0179400 A1 | 12/2002 | Dersham et al. | |
| 2002/0179502 A1 | 12/2002 | Cerutti et al. | |
| 2003/0218307 A1 * | 11/2003 | Anderson | B62B 3/005 280/79.2 |
| 2005/0002762 A1 | 1/2005 | Gambarelli et al. | |
| 2006/0045672 A1 | 3/2006 | Maynard et al. | |
| 2008/0181753 A1 | 7/2008 | Bastian et al. | |
| 2009/0129902 A1 | 5/2009 | Schafer | |
| 2010/0036675 A1 | 2/2010 | Schäfer | |
| 2010/0096243 A1 | 4/2010 | Balk | |
| 2010/0300842 A1 | 12/2010 | Bastian, II et al. | |
| 2010/0316469 A1 | 12/2010 | Lert et al. | |
| 2011/0056806 A1 | 3/2011 | Johnson | |
| 2011/0144798 A1 | 6/2011 | Freudelsperger | |
| 2011/0262253 A1 | 10/2011 | Krizmanic et al. | |
| 2012/0029687 A1 | 2/2012 | Hagen et al. | |
| 2012/0128454 A1 | 5/2012 | Hayduchok et al. | |
| 2012/0177465 A1 | 7/2012 | Koholka | |
| 2012/0328397 A1 | 12/2012 | Yamashita | |
| 2013/0051696 A1 | 2/2013 | Garrett et al. | |
| 2014/0031972 A1 | 1/2014 | DeWitt et al. | |
| 2014/0056672 A1 | 2/2014 | Mathys et al. | |
| 2014/0086714 A1 | 3/2014 | Malik | |
| 2014/0142746 A1 | 5/2014 | Vegh et al. | |
| 2014/0212257 A1 | 7/2014 | Yamashita | |
| 2014/0244026 A1 | 8/2014 | Neiser | |
| 2014/0277692 A1 | 9/2014 | Buzan et al. | |
| 2014/0277693 A1 | 9/2014 | Naylor | |
| 2014/0288696 A1 | 9/2014 | Lert | |
| 2015/0098775 A1 | 4/2015 | Razumov | |
| 2015/0294260 A1 | 10/2015 | Napoli | |
| 2016/0107848 A1 | 4/2016 | Baker | |
| 2016/0122135 A1 | 5/2016 | Bastian, II | |
| 2016/0221757 A1 | 8/2016 | DeWitt et al. | |
| 2016/0355337 A1 | 12/2016 | Lert et al. | |
| 2017/0015502 A1 | 1/2017 | Engel et al. | |
| 2017/0043953 A1 | 2/2017 | Battles et al. | |
| 2017/0057756 A1 | 3/2017 | Dugat et al. | |
| 2017/0136632 A1 | 5/2017 | Wagner et al. | |
| 2017/0173638 A1 | 6/2017 | Wagner et al. | |
| 2017/0267452 A1 | 9/2017 | Goren et al. | |
| 2017/0330135 A1 | 11/2017 | Taylor et al. | |
| 2017/0349385 A1 | 12/2017 | Maroni et al. | |
| 2018/0037410 A1 | 2/2018 | DeWitt | |
| 2018/0057264 A1 | 3/2018 | Wicks et al. | |
| 2018/0075402 A1 | 3/2018 | Stadie et al. | |
| 2018/0085788 A1 | 3/2018 | Engel | |
| 2018/0105363 A1 | 4/2018 | Lisso | |
| 2018/0208397 A1 | 7/2018 | Schack et al. | |
| 2018/0251302 A1 | 9/2018 | Valinsky et al. | |
| 2018/0265311 A1 | 9/2018 | Wagner et al. | |
| 2018/0273296 A1 | 9/2018 | Wagner et al. | |
| 2018/0273298 A1 | 9/2018 | Wagner et al. | |
| 2018/0282066 A1 | 10/2018 | Wagner et al. | |
| 2018/0290830 A1 | 10/2018 | Valinsky et al. | |
| 2018/0327198 A1 | 11/2018 | Wagner et al. | |
| 2018/0354719 A1 | 12/2018 | Hoffman | |
| 2019/0218033 A1 | 7/2019 | Muttathil et al. | |
| 2019/0329979 A1 | 10/2019 | Wicks et al. | |
| 2020/0005005 A1 | 1/2020 | Wagner et al. | |
| 2020/0016746 A1 * | 1/2020 | Yap | B65G 47/2445 |
| 2020/0039745 A1 | 2/2020 | Khodl et al. | |
| 2020/0152259 A1 | 5/2020 | DeWitt et al. | |
| 2020/0265380 A1 | 8/2020 | Dubois et al. | |
| 2020/0302390 A1 | 9/2020 | Elazary et al. | |
| 2020/0407178 A1 | 12/2020 | Battles et al. | |
| 2021/0039140 A1 | 2/2021 | Geyer et al. | |
| 2021/0039881 A1 | 2/2021 | Zhu et al. | |
| 2021/0039887 A1 | 2/2021 | Zhu et al. | |
| 2021/0047117 A1 | 2/2021 | Stevens et al. | |
| 2021/0047118 A1 | 2/2021 | Stevens et al. | |
| 2021/0276796 A1 | 9/2021 | Long | |
| 2021/0276797 A1 | 9/2021 | Velagapudi et al. | |
| 2021/0276798 A1 | 9/2021 | Velagapudi et al. | |
| 2021/0276799 A1 | 9/2021 | Velagapudi et al. | |
| 2021/0300685 A1 * | 9/2021 | Dieges | B65G 47/74 |
| 2021/0394807 A1 * | 12/2021 | Kontuniemi | B62B 3/025 |
| 2022/0089387 A1 * | 3/2022 | Dederichs | B65G 47/8815 |
| 2022/0234825 A1 | 7/2022 | Krishnamoorthy et al. | |
| 2022/0284393 A1 | 9/2022 | Al et al. | |
| 2022/0356017 A1 | 11/2022 | Romano et al. | |
| 2023/0077893 A1 | 3/2023 | Gebhardt et al. | |
| 2023/0119061 A1 | 4/2023 | Halamka et al. | |
| 2023/0137545 A1 | 5/2023 | Austrheim | |
| 2023/0150770 A1 | 5/2023 | Sebastian | |

(56) References Cited

U.S. PATENT DOCUMENTS

| | | |
|---|---|---|
| 2023/0219767 A1 | 7/2023 | Demir et al. |
| 2023/0249914 A1 | 8/2023 | Fosnight et al. |
| 2023/0271785 A1 | 8/2023 | Gravelle et al. |
| 2023/0331475 A1 | 10/2023 | Yamashita |
| 2024/0425289 A1 | 12/2024 | Velagapudi et al. |
| 2025/0136385 A1 | 5/2025 | Raja et al. |

FOREIGN PATENT DOCUMENTS

| | | |
|---|---|---|
| CN | 102001506 A | 4/2011 |
| CN | 102264602 A | 11/2011 |
| CN | 103332426 A | 10/2013 |
| CN | 104169196 A | 11/2014 |
| CN | 104859990 A | 8/2015 |
| CN | 104925440 A | 9/2015 |
| CN | 205257168 U | 5/2016 |
| CN | 105858042 A | 8/2016 |
| CN | 205820147 U | 12/2016 |
| CN | 104495181 B | 2/2017 |
| CN | 206456846 U | 9/2017 |
| CN | 107635896 A | 1/2018 |
| CN | 107720072 A | 2/2018 |
| CN | 108146948 A | 6/2018 |
| CN | 108700869 A | 10/2018 |
| CN | 109081027 A | 12/2018 |
| CN | 110062740 A | 7/2019 |
| CN | 110325462 A | 10/2019 |
| CN | 209506761 U | 10/2019 |
| CN | 110431097 A | 11/2019 |
| CN | 110461734 A | 11/2019 |
| CN | 110462657 A | 11/2019 |
| CN | 209720654 U | 12/2019 |
| CN | 110662707 A | 1/2020 |
| CN | 110691742 A | 1/2020 |
| CN | 110740954 A | 1/2020 |
| CN | 110803439 A | 2/2020 |
| CN | 115210152 A | 10/2022 |
| CN | 115243987 A | 10/2022 |
| CN | 115243988 A | 10/2022 |
| CN | 117255718 A | 12/2023 |
| CN | 118139798 A | 6/2024 |
| DE | 102004014378 A1 | 10/2005 |
| DE | 102008046325 A1 | 3/2010 |
| EP | 1151942 A2 | 11/2001 |
| EP | 2818433 A1 | 12/2014 |
| EP | 3354598 A1 | 8/2018 |
| EP | 3572355 A1 | 11/2019 |
| EP | 4114766 A2 | 1/2023 |
| EP | 4114767 A1 | 1/2023 |
| EP | 4114768 A1 | 1/2023 |
| EP | 4114769 A1 | 1/2023 |
| EP | 4334045 A2 | 3/2024 |
| JP | S5826703 A | 2/1983 |
| JP | S6015302 A | 1/1985 |
| JP | 2007131383 A | 5/2007 |
| JP | 2003104513 A | 4/2009 |
| JP | 2013052958 A | 3/2013 |
| JP | 2008110779 A | 5/2015 |
| JP | 2009035407 A | 2/2019 |
| TW | 201300298 A | 1/2013 |
| WO | 2007009136 A1 | 1/2007 |
| WO | 2009089159 A2 | 7/2009 |
| WO | 2010040809 A1 | 4/2010 |
| WO | 2011012611 A1 | 2/2011 |
| WO | 2012106744 A1 | 8/2012 |
| WO | 2014080041 A1 | 5/2014 |
| WO | 2016105201 A2 | 6/2016 |
| WO | 2017123678 A1 | 7/2017 |
| WO | 2018175466 A1 | 9/2018 |
| WO | 2018195196 A1 | 10/2018 |
| WO | 2021026359 A1 | 2/2021 |
| WO | 2021178819 | 9/2021 |
| WO | 2021178826 A1 | 9/2021 |
| WO | 2021178830 A1 | 9/2021 |
| WO | 2022236038 A2 | 11/2022 |
| WO | 2023064465 A1 | 4/2023 |
| WO | 2025090546 A1 | 5/2025 |

OTHER PUBLICATIONS

Examiner's Report issued by the Innovation, Science and Economic Development Canada (Canadian Intellectual Property Office) in related Canadian Patent Application No. 3,174,544 on Nov. 6, 2023, 4 pages.

Examiner's Report issued by the Innovation, Science and Economic Development Canada (Canadian Intellectual Property Office) in related Canadian Patent Application No. 3,174,546 on Nov. 7, 2023, 4 pages.

Examiner's Report issued by the Innovation, Science and Economic Development Canada (Canadian Intellectual Property Office) in related Canadian Patent Application No. 3,174,543 on Nov. 6, 2023, 4 pages.

Examiner's Report issued by the Innovation, Science and Economic Development Canada (Canadian Intellectual Property Office) in related Canadian Patent Application No. 3,174,552 on Nov. 29, 2023, 6 pages.

International Preliminary Report on Patentability issued by the International Bureau of WIPO in related International application No. PCT/US2022/028047 on Oct. 24, 2023, 14 pages.

International Preliminary Report on Patentability issued by the International Bureau of WIPO in related international application No. PCT/US2022/046561 on Apr. 16, 2024, 7 pages.

Non-Final Office Action issued by the United States Patent and Trademark Office in related U.S. Appl. No. 17/193,377 on Mar. 21, 2024, 44 pages.

Non-Final Office Action issued by the United States Patent and Trademark Office in related U.S. Appl. No. 17/193,380 on Mar. 27, 2024, 40 pages.

Non-Final Office Action issued by the United States Patent and Trademark Office in related U.S. Appl. No. 17/193,384 on Apr. 5, 2024, 38 pages.

Notice of Third Office Action, along with its English translation, issued by the China National Intellectual Property Administration in related Chinese Patent Application No. 202180018310.4 on Apr. 17, 22 pages.

Notice of Third Office Action, along with its English translation, issued by the China National Intellectual Property Administration in related Chinese Patent Application No. 202180018333.5 on Apr. 17, 31 pages.

Notice of Third Office Action, along with its English translation, issued by the China National Intellectual Property Administration in related Chinese Patent Application No. 202180018364.0 on Apr. 17, 2024, 24 pages.

Notice on the Second Office Action, along with its English translation, issued by the China National Intellectual Property Administration in related Chinese Patent Application No. 202180018310.4 on Oct. 11, 2023, 24 pages.

Notice on the Second Office Action, along with its English translation, issued by the China National Intellectual Property Administration in related Chinese Patent Application No. 202180018333.5 on Oct. 12, 2023, 35 pages.

Notice on the Second Office Action, along with its English translation, issued by the China National Intellectual Property Administration in related Chinese Patent Application No. 202180018364.0 on Oct. 11, 2023, 19 pages.

Non-Final Office Action issued by the United States Patent and Trademark Office in related U.S. Appl. No. 17/193,378 on Aug. 4, 2023, 26 pages.

Notice of First Office Action, along with its English translation, issued by the China National Intellectual Property Office in related Chinese Patent Application No. 202180018333.5 on Mar. 31, 2023, 32 pages.

Notice of First Office Action, along with its English translation, issued by the China National Intellectual Property Office in related Chinese Patent Application No. 202180018436.1 on Mar. 31, 2023, 17 pages.

(56) References Cited

OTHER PUBLICATIONS

Notice on the First Office Action, along with its English translation, issued by the China National Intellectual Property Administration, in related Chinese Patent Application No. 202180018364.0 on Mar. 30, 2023, 23 pages.
Notice on the First Office Action, along with its English translation, issued by the China National Intellectual Property Administration, in related Chinese Patent Application No. 202180018310.4 on Mar. 30, 2023, 21 pages.
Annex to Form PCT/ISA/206, Communication Relating to the Results of the Partial International Search and Provisional Opinion Accompanying the Partial Search Result issued by the International Searching Authority, the European Patent Office, in related International Application No. PCT/US2021/021140 on Jul. 6, 2021, 2 pages.
Annex to Form PCT/ISA/206, Communication Relating to the Results of the Partial International Search issued by the European Patent Office, as the International Searching Authority, in related International Application No. PCT/US2022/028047 on Sep. 22, 2022, 2 pages.
Communication pursuant to Rules 161(1) and 162 EPC issued by the European Patent Office in related European Patent Application No. 21714588.7 on Oct. 13, 2022, 3 pages.
Communication pursuant to Rules 161(1) and 162 EPC issued by the European Patent Office in related European Patent Application No. 21714590.3 on Oct. 13, 2022, 3 pages.
Communication pursuant to Rules 161(1) and 162 EPC issued by the European Patent Office in related European Patent Application No. 21714592.9 on Oct. 13, 2022, 3 pages.
Communication pursuant to Rules 161(1) and 162 EPC issued by the European Patent Office in related European Patent Application No. 21715372.5 on Oct. 13, 2022, 3 pages.
International Preliminary Report on Patentability and the International Preliminary Report on Patentability issued by the International Bureau of WIPO in related International Application No. PCT/US2021/021118 on Sep. 6, 2022, 9 pages.
International Preliminary Report on Patentability issued by the International Bureau of WIPO in related International Application No. PCT/US2021/021128 on Sep. 6, 2022, 8 pages.
International Preliminary Report on Patentability issued by the International Bureau of WIPO in related International Application No. PCT/US2021/021133 on Sep. 6, 2022, 7 pages.
International Preliminary Report on Patentability issued by the International Bureau of WIPO in related International Application No. PCT/US2021/021140 on Sep. 15, 2022, 10 pages.
International Search Report and the Written Opinion of the International Searching Authority, or the Declaration, and the International Search Report and Written Opinion of the International Searching Authority (the European Patent Office) issued in related International Application No. PCT/US2022/028047 on Nov. 14, 2022, 20 pages.
International Search Report and Written Opinion issued by the International Searching Authority (the European Patent Office) in related International Application No. PCT/US2021/021128 on Jun. 21, 2021, 12 pages.
International Search Report and Written Opinion issued by the International Searching Authority (the European Patent Office) in related International Application No. PCT/US2021/021140 on Sep. 3, 2021, 16 pages.
International Search Report and Written Opinion of the International Searching Authority, the European Patent Office, issued in related International Application No. PCT/US2021/021118 on Jul. 16, 2021, 12 pages.
International Search Report and Written Opinion of the International Searching Authority issued by the European Patent Office in related International Application No. PCT/US2021/021133 on Jun. 21, 2021, 11 pages.
International Search Report and Written Opinion of the International Searching Authority, the European Patent Office, issued in related International Application No. PCT/US2022/046561 on Feb. 13, 2023, 13 pages.
Communication pursuant to Rules 161(1) and 162 EPC issued by the European Patent Office in related European Patent Application No. 22809552.7 on May 22, 2024, 3 pages.
International Search Report and Written Opinion of the International Searching Authority issued by the European Patent Office, as the International Searching Authority, in related International application No. PCT/US2024/052472 on Jan. 22, 2025, 14 pages.
Chapter 5 High-bay Warehouses and equipment thereof of Modern Machinery and Equipment Design Manual, vol. 3, Non-Standard Machinery and Equipment Design, edited by Fan Zuyao, pp. 16-261, China Machine Press, Oct. 1996, 11 pages.

* cited by examiner

ROBOTIC PUT WALL SYSTEMS AND METHODS WITH MOBILE DESTINATION LOCATION ASSEMBLIES

PRIORITY

The present application claims priority to U.S. Provisional Patent Application No. 63/255,215, filed Oct. 13, 2021, the disclosure of which is hereby incorporated by reference in its entirety.

BACKGROUND

The invention generally relates to object processing systems, and relates in particular to object processing systems such as automated storage and retrieval systems, distribution center systems, and sortation systems that are used for processing a variety of objects.

Current object processing systems generally involve the processing of a large number of objects, where the objects are received in either organized or disorganized batches, and must be routed to desired destinations in accordance with a manifest or specific addresses on the objects (e.g., in a mailing/delivery system).

Automated storage and retrieval systems (AS/RS), for example, generally include computer-controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

Current distribution center sorting systems, for example, generally assume an inflexible sequence of operations whereby a disorganized stream of input objects is first singulated into a single stream of isolated objects presented one at a time to a scanner that identifies the object. An induction element (e.g., a conveyor, a tilt tray, or manually movable bins) transport the objects to the desired destination or further processing station, which may be a bin, an inclined shelf, a chute, a bag or a conveyor, etc.

In parcel sortation systems, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system determines that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Adding to these challenges are the conditions that some objects may have information about the object entered into the manifest or a shipping label incorrectly. For example, if a manifest in a distribution center includes a size or weight of an object that is not correct (e.g., because it was entered manually incorrectly), or if a shipping sender enters an incorrect size or weight on a shipping label, the processing system may reject the object as being unknown. Additionally, and with regard to incorrect information on a shipping label, the sender may have been undercharged due to the erroneous information, for example, if the size or weight was entered incorrectly by the sender.

There remains a need for more efficient and more cost-effective object processing systems that process objects of a variety of sizes and weights into appropriate collection bins or boxes, yet is efficient in handling objects of such varying sizes and weights.

SUMMARY

In accordance with an aspect, the invention provides an object processing system that includes an object induction station at which objects are provided for processing. The object induction station includes at least one perception unit for providing perception data regarding an object, and an object processing system for receiving objects from the object induction station, and for urging an object into a first end of one of a plurality of chute location, each of which including a first end that is accessible by the carrier and a second end that is accessible by a mobile destination container of a plurality of mobile destination containers.

In accordance with another aspect, the invention provides an object processing system that includes an object induction station at which objects are provided for processing at a processing station, said object induction station including at least one perception unit for providing perception data regarding an object, an object processing system for receiving objects from the object induction station, and for providing objects to one of a plurality of chute locations, and a mobile destination location assembly for positioning adjacent the processing station, each of which includes a mobile destination container of a plurality of mobile destination containers for receiving objects from the plurality of chute locations.

In accordance with a further aspect, the invention provides a method of processing objects that includes providing objects for processing at an object induction station, said object induction station including at least one perception unit for providing perception data regarding an object, receiving objects from the object processing system, providing objects to one of a plurality of chute locations, and positioning a mobile destination location assembly adjacent the processing station, each of which includes a mobile destination container of a plurality of mobile destination containers for receiving objects from the plurality of chute locations.

BRIEF DESCRIPTION OF THE DRAWINGS

The following description may be further understood with reference to the accompanying drawings in which.

Figure 1:
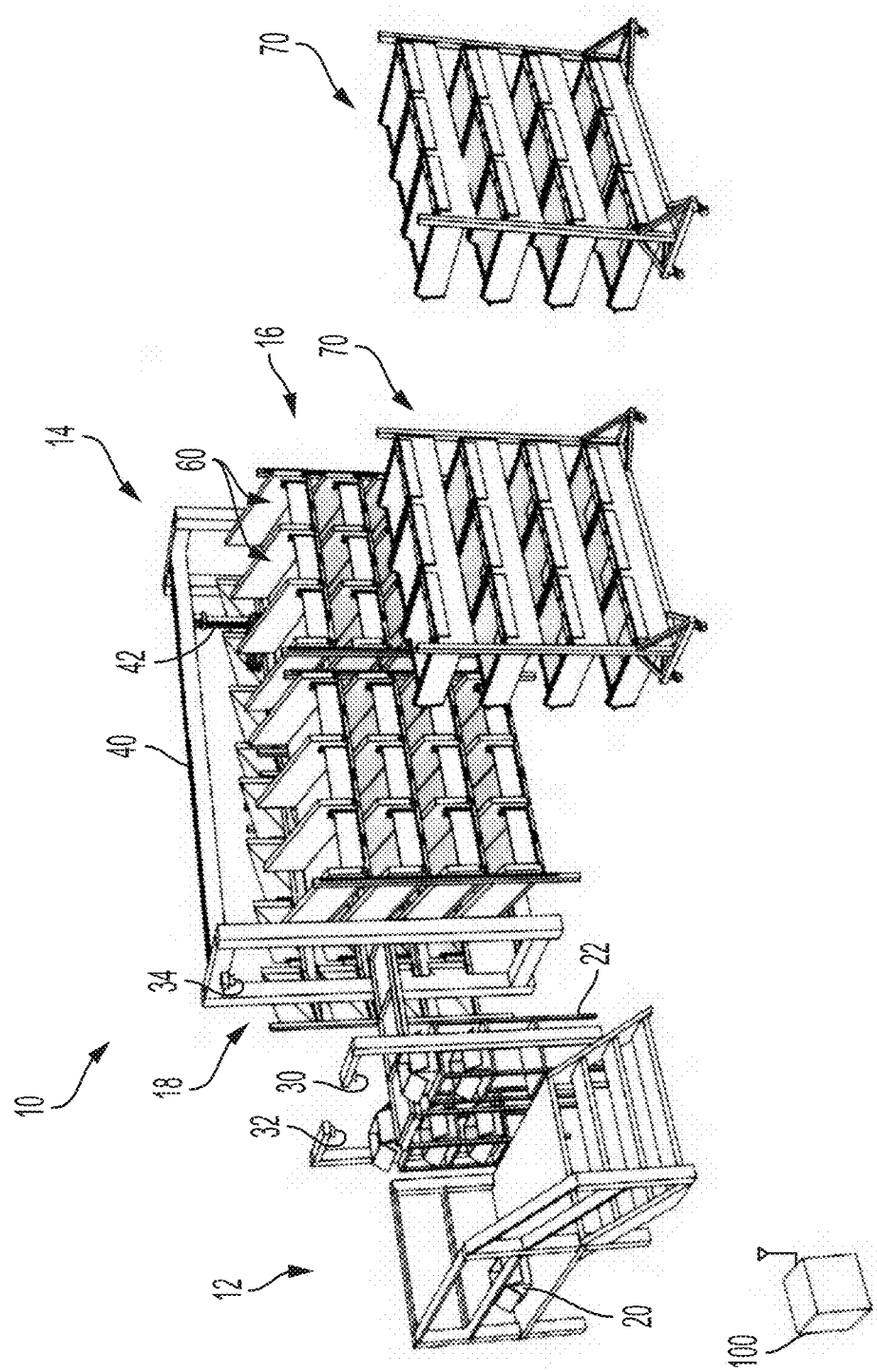
FIG. 1 shows an illustrative diagrammatic view of an object processing system in accordance with an aspect of the present invention.

The drawings are shown for illustrative purposes only.

DETAILED DESCRIPTION

The invention provides an efficient and economical object processing system that may be used, for example, to provide any of shipping orders from a wide variety of objects, groupings of objects for shipping purposes to a variety of locations, and locally specific groupings of objects for collection and shipment to a large location with locally specific areas such as product aisles in a retail store. Each of the systems may be designed to meet key performance indicators (KPIs), while satisfying industrial and system safety standards.

In accordance with an aspect, the system provides a robotic put wall (RPW) that is designed to enable fast, accurate sortation of retail items, or eaches, from a tote of mixed inventory into an array of sort locations, each containing one customer order. The RPW is comprised, in accordance with an aspect, of four major components: an operator induction station, a 2D gantry with carrier, inclined chute shelving, and a pack-to-light interface.

The operator induction station may include a human operator station located at one end of the system. The operator receives a stream of heterogeneous totes of mixed objects (e.g., items, products, goods, etc.) that collectively contain the material for a large number of customer orders. The operator is responsible for picking up each item, using a scanner to identify the item to the system via UPC, and then placing the item onto the 2D gantry carrier.

The 2D gantry carrier may include an X-Z gantry with a carrier that receives objects from the operator and transports them to any of a large number of order sortation points. The gantry is a 2-axis gantry. At the gantry tool-tip is the carrier, which is a small, belted conveyor section oriented to move items in the Y axis in accordance with an aspect. When the carrier has arrived at the X-Z address of a particular sort location, the conveyor section actuates to move the item into the shelf location on one or the other side of the gantry. This object movement happens at high enough speeds to ensure that the object does not fall between the carrier and the chute shelving, and that the inertia of the object carries it to the outside of the sort location (away from the carrier).

The inclined shelving may support, for example, sorting to up to 240 different destinations in accordance with an aspect. Various systems may provide varying requirements for order count, stockkeeping unit SKU size, and physical order volume that drive the need for reconfigurability in the chute shelving locations. Chute units (or modules) include the chutes on either side of the gantry, and modules can be configured with a varying number of chutes. Each level for example, may be divided into thirds with vertical dividers to keep orders separated. Chutes can be installed on vertical increments with, for example, a minimum pitch of 6" and maximum pitch of 18". A complete system can include a variety of number of modules.

The pack-to-light interface may provide communication between the system and human operators. As objects accumulate in the order sort locations, eventually orders will become complete and need to be removed from the sort locations by a human operator. The pack to light interface on the outside of the system serves to notify the operator via an illuminated button that an order is complete and ready to be removed and packaged. The operator also uses the same button to inform the system that the order has been removed and the sort location is clear. Further, an alphanumeric interface can provide additional information to the operator such as the count of objects to be removed or details related to merging multiple locations together into one large order.

FIG. 1 for example, shows an operator inducted object processing system 10 in accordance with an aspect of the present invention that includes an object induction station 12, an object processing system 14, and two object collection stations 16, 18 that are provided as a pair of arrays of chute locations 60. During use, an operator may stand on the platform, and access boxes 20 that are positioned on supports 22 proximate the operator. Objects may be removed from the boxes 20 and loaded one at a time onto a conveyor 24. One or more perception units 30, 32 may identify unique indicia on each object as it is lifted and placed onto the conveyor 24, which may optionally include cleats 25. A further perception system 34 above the conveyor 24 may also be used to verify the identity (and singularity) of the selected object. In further aspects, the operator may scan each object individually with a hand-held scanner. In any event, the operator load station 12 is the place where the human operator selects and scans items for induction into the system.

The station 12 may include provision for getting full totes to the operator, as well as taking empty totes away. There may also be provisions for further perception units such as barcode scanners, either fixed, handheld, or both. There may also be provided structure for mounting a touchscreen display or other HMI at the station 12. The station 12 may be located such that an operator can stand ergonomically, and can place items to the carrier. From the conveyor 24, objects are moved by a gantry mounted carrier of the object processing system 14 to bring each object serially to one of the plurality of destination locations as discussed in more detail below.

Safety is a significant design aspect of the operator load station. One way to increase safety is with a conveyor that is long enough to separate the operator from carrier, which is heavy and moving at high speeds. This has the disadvantage of not allowing the operator to place items directly to the carrier, which might mean having to reduce overall item size specs due to need to accommodate for tumbling of items from transfer conveyor to carrier in certain applications.

Another way to increase safety is with light curtains, beam breaks, safety rated encoders on the gantry, etc. In accordance with this, the carrier may slow to a safe speed while within reach of the operator, and then stop if the operator breaks a light curtain, etc. A further way to increase safety is to use a mechanically interlocked door that only opens when the carrier is in position, and is locked otherwise. A goal may be to achieve a less than one second operator cycle time. This is defined as the time between the carrier arriving at the load position and the time at which it is loaded and ready to move away. Operational control of the system is provided by one or more computer control systems 100 that communicate (wired or wirelessly) to the conveyors, perception units, gantry, carrier and input/output devices of the system.

Figure 2A:
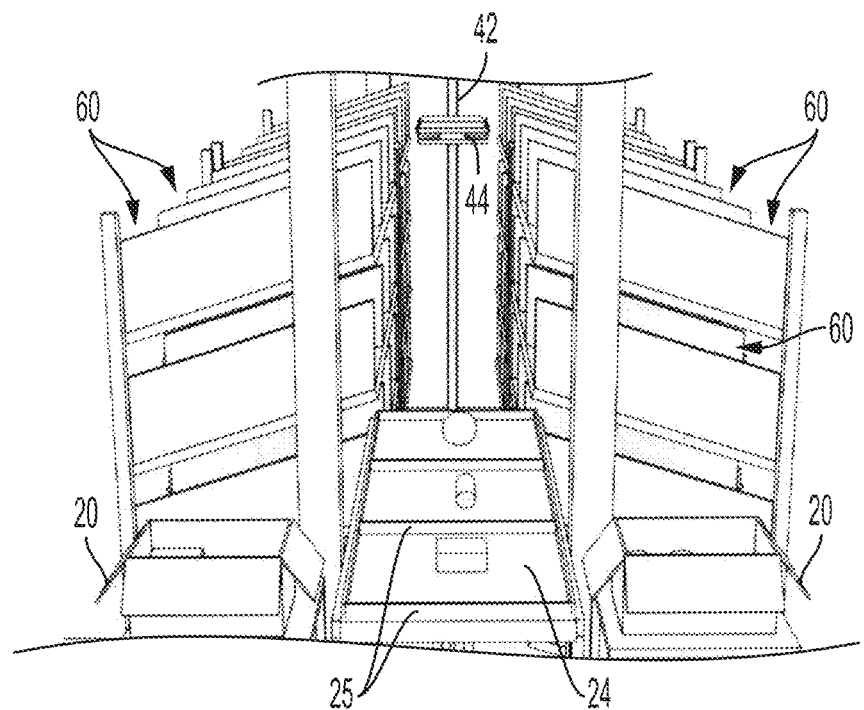
FIGS. 2A-2D show illustrative diagrammatic front views of a portion of the system of FIG. 1 showing a carrier approaching an input area (FIG. 2A), having arrived at the input area for loading (FIG. 2B), moving away from the input area with the load (FIG. 2C), and delivering the load to a destination location chute (FIG. 2D)
Figure 2B:
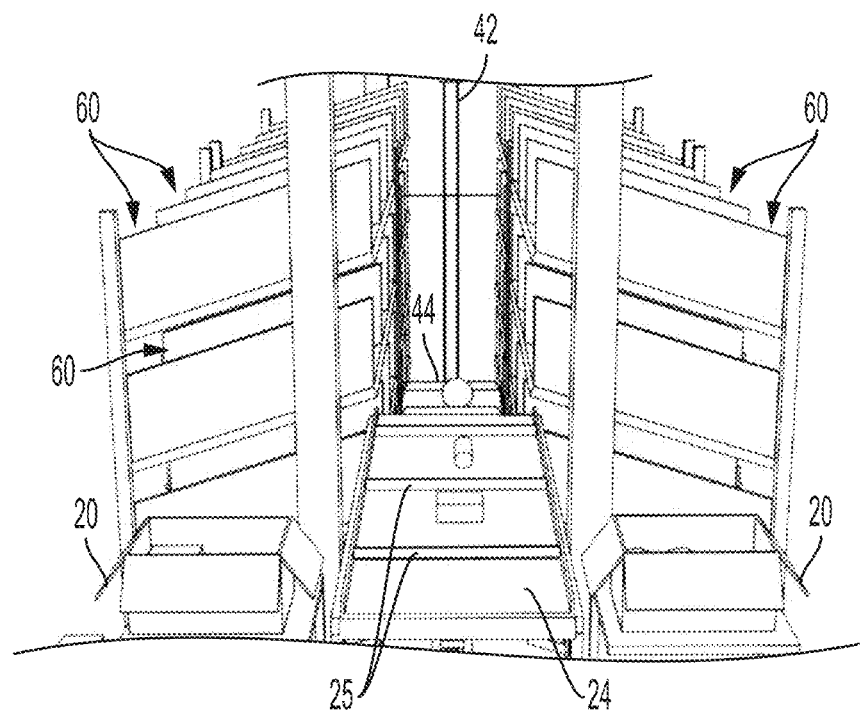
Figure 2C:
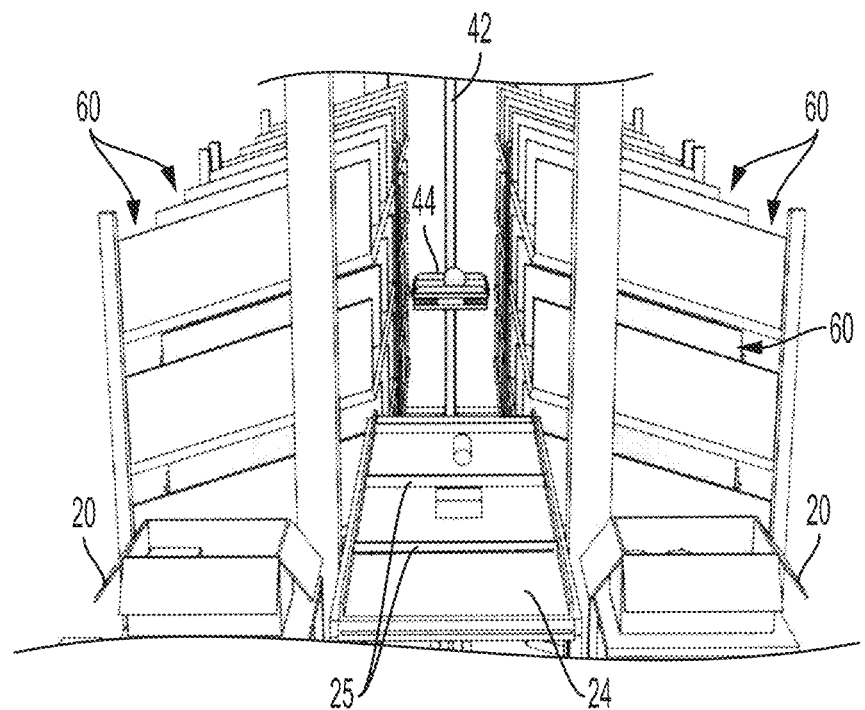
Figure 2D:
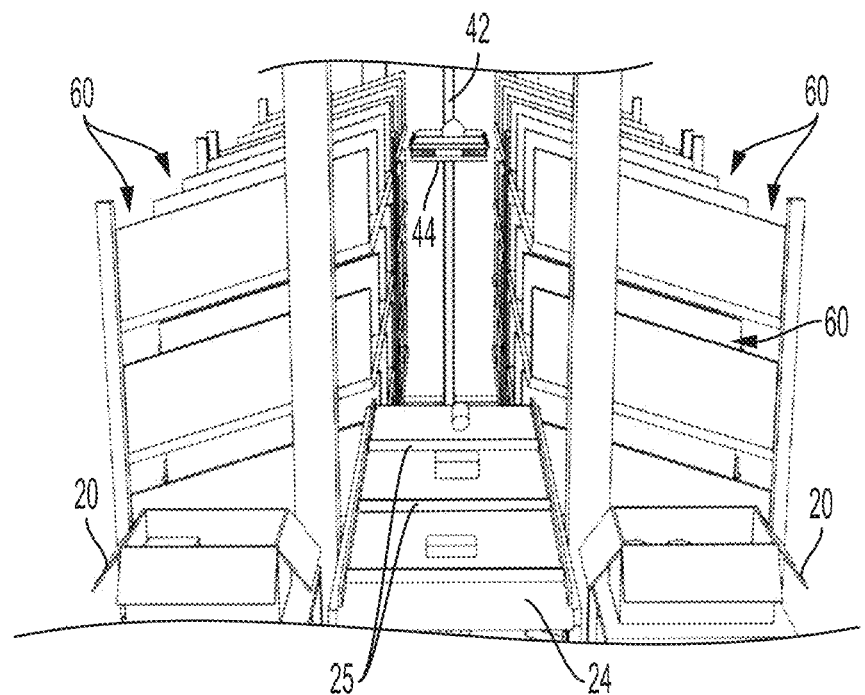

FIG. 2A shows a front view of the object processing system 14 that includes a gantry with a horizontal moving member 40 and a travelling vertical member 42 that moves with the horizontal moving member 40 as discussed below with further reference to FIGS. 5A and 5B. A carrier 44 is mounted on the vertical member 42. As the conveyor 24 advances toward the system 14, the carrier 44 returns to a home position (shown in FIG. 2B) that is adjacent the conveyor 24. An object at the end of the conveyor 24 is then moved onto the carrier 44 as shown in FIG. 2B. FIG. 2C shows the carrier moving horizontally, and FIG. 2D shows the carrier moving vertically toward a selected destination location. The time required to move to and return from each destination location is known, and the speed of the conveyor is modulated such that as each loaded object on the conveyor 24 reaches the object processing system 14, the carrier 44 is positioned to receive the object from the conveyor 24. This ensures that the conveyor moves continuously, as the operator is loading objects onto the conveyor. In accordance with further aspects, the speed of movement of the conveyor 24 may further be dependent on handling parameters of an object that is currently being moved by the carrier as discussed in more detail below. The perception units 30, 32 of FIG. 1 are removed from FIGS. 2A-2D for clarity. The 2D gantry is an X-Z cartesian robot capable of moving items along the horizontal and vertical face of the machine. The frame that supports the gantry programmable motion device provides that the shelving and gantry programmable motion device including the carrier may be positioned close enough together that a gap between the carrier and each destination location may be traversed given each object's mass and the acceleration of the carrier conveyor on the carrier.

Figure 3A:
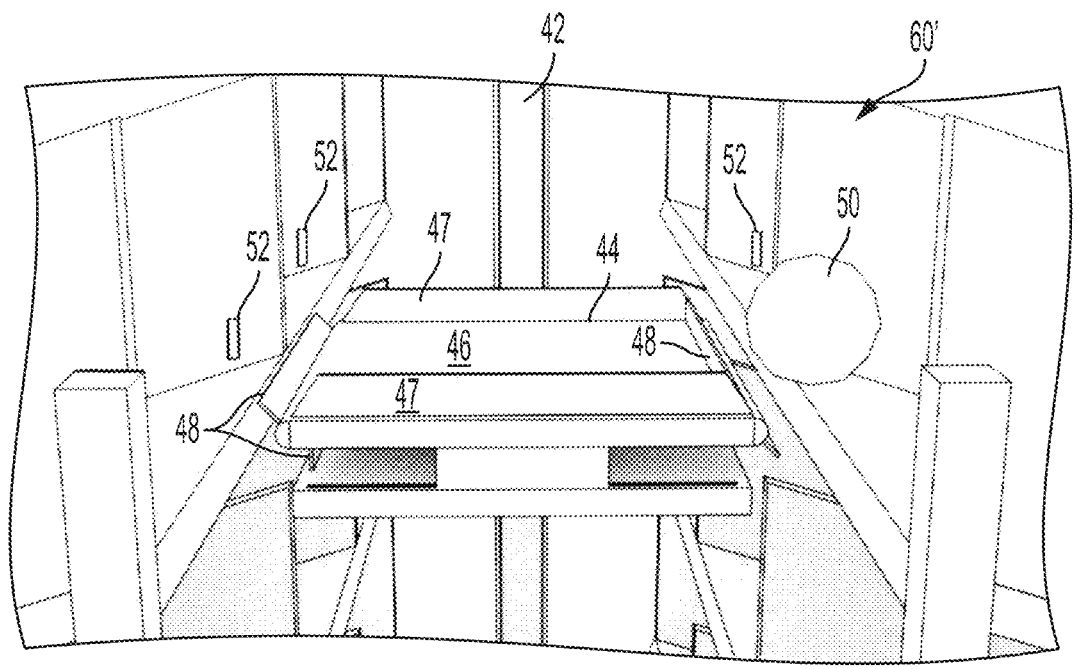
FIGS. 3A and 3B show illustrative diagrammatic enlarged views of the carrier of the system of FIG. 1 showing the carrier discharging the object in a first direction (FIG. 3A) and in a second opposite direction (FIG. 3B)
Figure 3B:
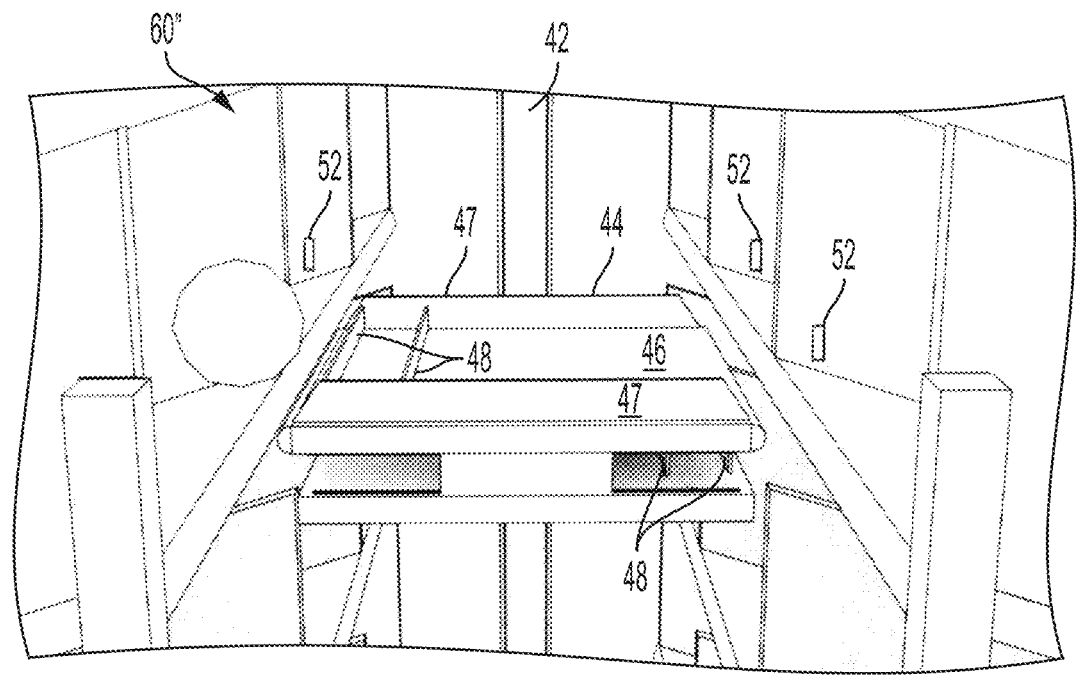

With reference to FIGS. 3A and 3B, the carrier 44 includes a conveyor 46 (optionally with cleats 48) that may be run (accelerated) in either of two opposing directions (that are generally orthogonal to the vertical and horizontal directions of the gantry 40, 42). FIG. 3A shows an object 50 being urged from the conveyor 46 to a destination location 60', and FIG. 3B shows the object 50 being urged in a direction opposite that of FIG. 3A from the conveyor 46 to a chute location 60." The conveyor 46 may be driven by a drive roller 41 powered by a motor 39 in either of opposing directions. The drive system may, for example, be configured to receive either of two instructions (for moving the conveyor 46 in either of two mutually opposing directions) one unit of movement where the unit may be, for example a full or one half revolution of the conveyor. In this way, a single command may be provided (e.g., wirelessly) that causes a clean discharge in either of the two discharge directions. Beam breaks 52 in the destination locations may also be used to identify when an object is received in a respective destination chute location 60.

The carrier therefore rides on the distal end of the gantry robot and delivers items to each shelving unit. The operator places items onto the carrier (either indirectly via conveyor 24 or directly), which then is moved by the gantry to the X-Z address associated with the selected destination for the desired storage location. The carrier then actuates its conveyor in either direction (plus or minus Y) to deposit the item into one of the two storage locations available at that X-Z address. In accordance with an aspect, the belt of the conveyor may take no longer than is to perform a half-revolution around the bed of the carrier, and the carrier includes retaining walls 47 on both sides parallel to the axis of motion of the carrier belt. The belt of the carrier conveyor may also have some combination of flights (or cleats) to discourage items from falling off in the sides perpendicular to the direction of the motion, and possibly to assist in urging objects from the carrier conveyor.

For objects that are known to have associated handling parameters that make urging the object from the carrier conveyor over a gap and into a selected destination location impractical (for example, if the object or packaging is fragile, has low position authority, low pose authority or is too heavy such as above 5 lbs or even 8 lbs), then the system may move the object toward the selected destination location more slowly, and in certain aspects, the carrier may be configured to move the carrier conveyor itself closer to the selected destination location.

Figure 4A:
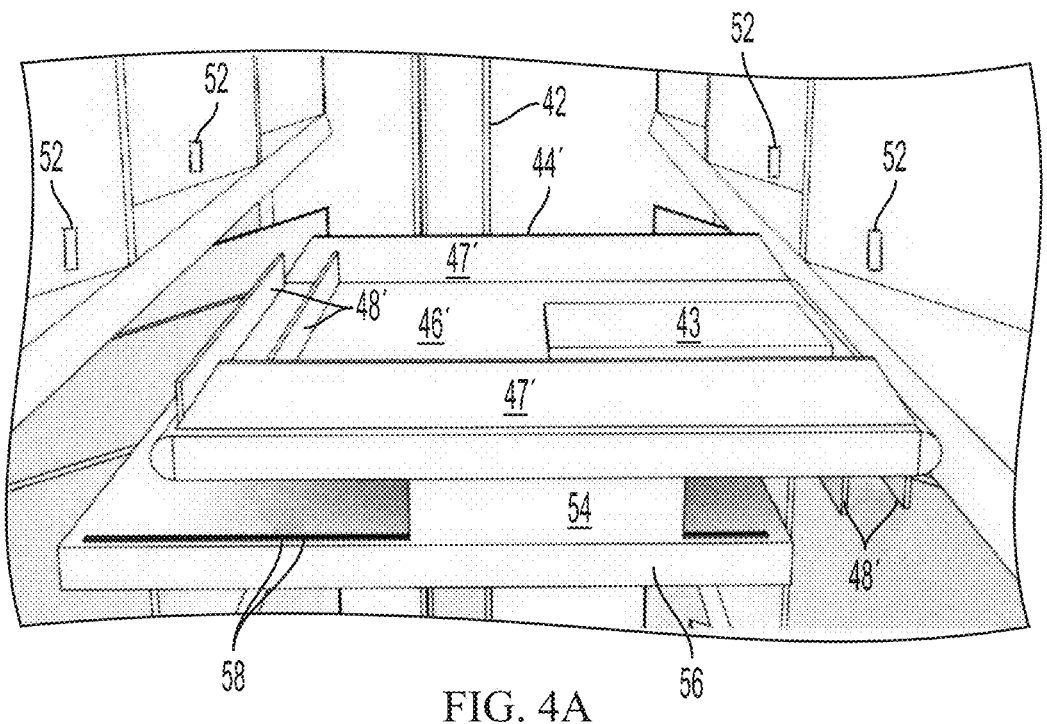
FIGS. 4A and 4B show illustrative diagrammatic enlarged views of a carrier in accordance with a further aspect of the present invention wherein the carrier is mounted on a sliding actuator, showing the carrier from above in an extended position (FIG. 4A) and showing the carrier from below in the extended position (FIG. 4B)
Figure 4B:
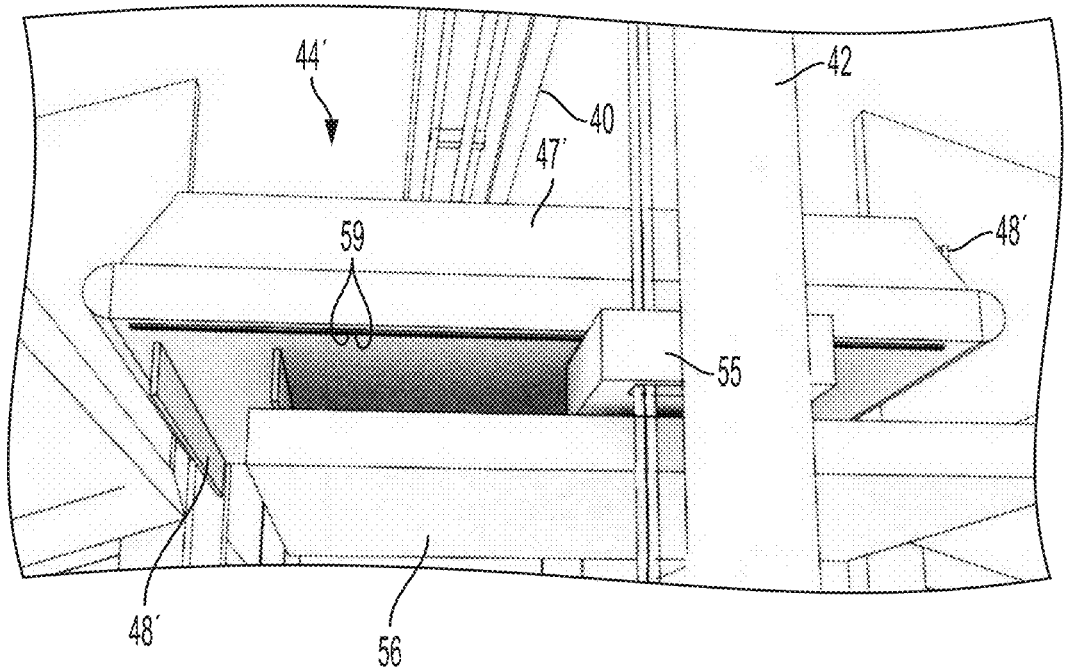

For example, FIG. 4A shows a carrier 44' in accordance with a further aspect that includes a conveyor 46' with cleats 48' and retaining walls 47'. The conveyor 46' is mounted on a sliding actuator that includes a mount 54 that is engaged by a linear motor system that runs along a track 58 on a base 56 (shown in FIG. 4A). As shown in FIGS. 4A and 4B, the carrier 44' may be moved toward a selected destination location such that an object 43 on the carrier that may be known to have special handling instructions may be moved to the selected chute location 60' more gently and with more control of the object's movement.

Figure 5A:
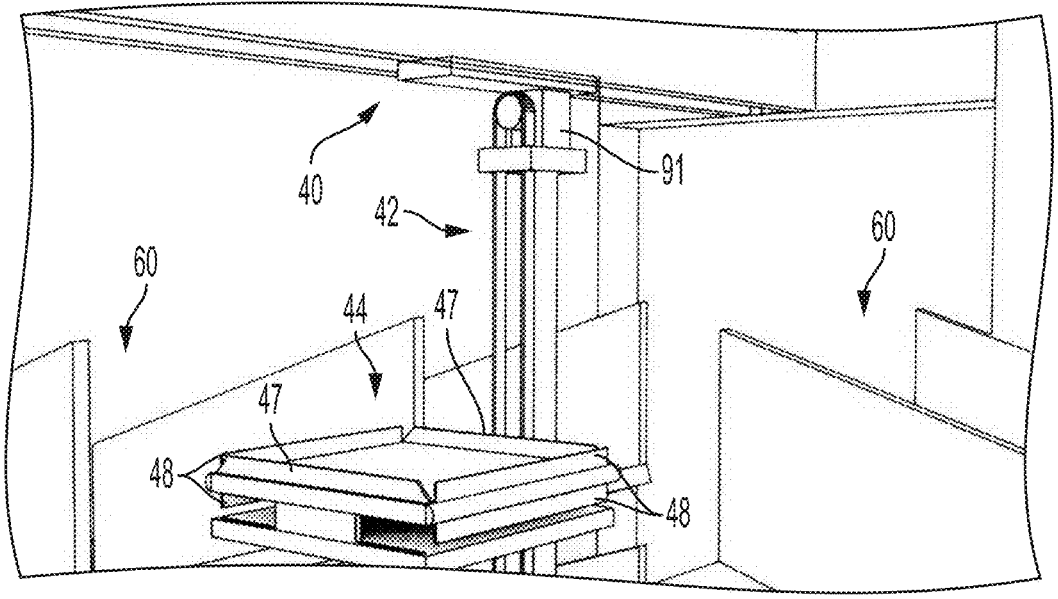
FIGS. 5A and 5B show illustrative diagrammatic views of a vertical carrier positioning system in the system of FIG. 1 (FIG. 5A) and a horizontal carrier positioning system in the system of FIG. 1 (FIG. 5B)
Figure 5B:
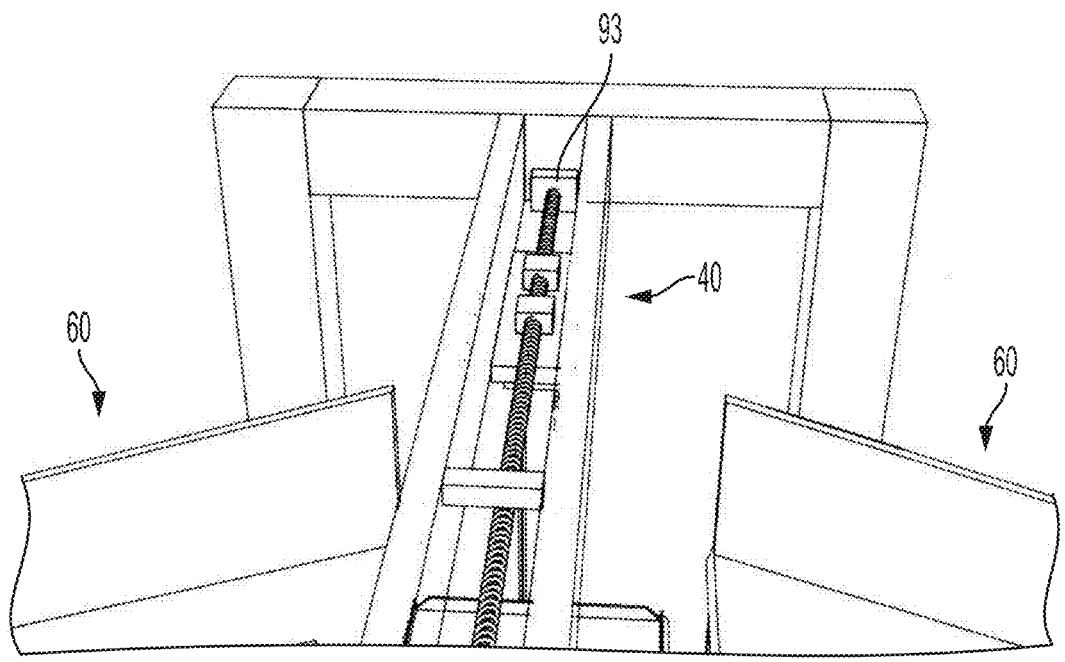

With reference to FIG. 5A, the vertical moving member 42 may include vertical drive system with a chain or belt that is drive around a drive roll by a vertical drive motor 91, with a portion of the chain or belt attached to the carrier 44 frame. With reference to FIG. 5B, the horizontal moving member may include horizontal drive system with a linear gear that is driven by a horizontal drive motor 93, with the vertical moving member end attached to one or more following nuts that are moved along a threaded shaft as the motor 93 rotates the shaft. A pair of vertical drive systems may be used (one at the top and one at the bottom), and a pair of horizontal drive systems may be used (again, one at the top and one at the bottom). The use of the independent drive systems permits the carrier to be freely moved in the X-Z plan between the arrays of destination locations. As movement directions may include simultaneous X and Z components, and the movements of the vertical and horizontal drive systems are independent of one another. Advantageously, the vertical drive system and the horizontal drive system each include motors and gearing that are supported by the put-wall frame, and are not on the carrier 44. Once on the carrier 44, objects are moved by the X-Z gantry of the object processing system to bring each object serially to one of the plurality of destination locations 60 as discussed.

Figure 6A:
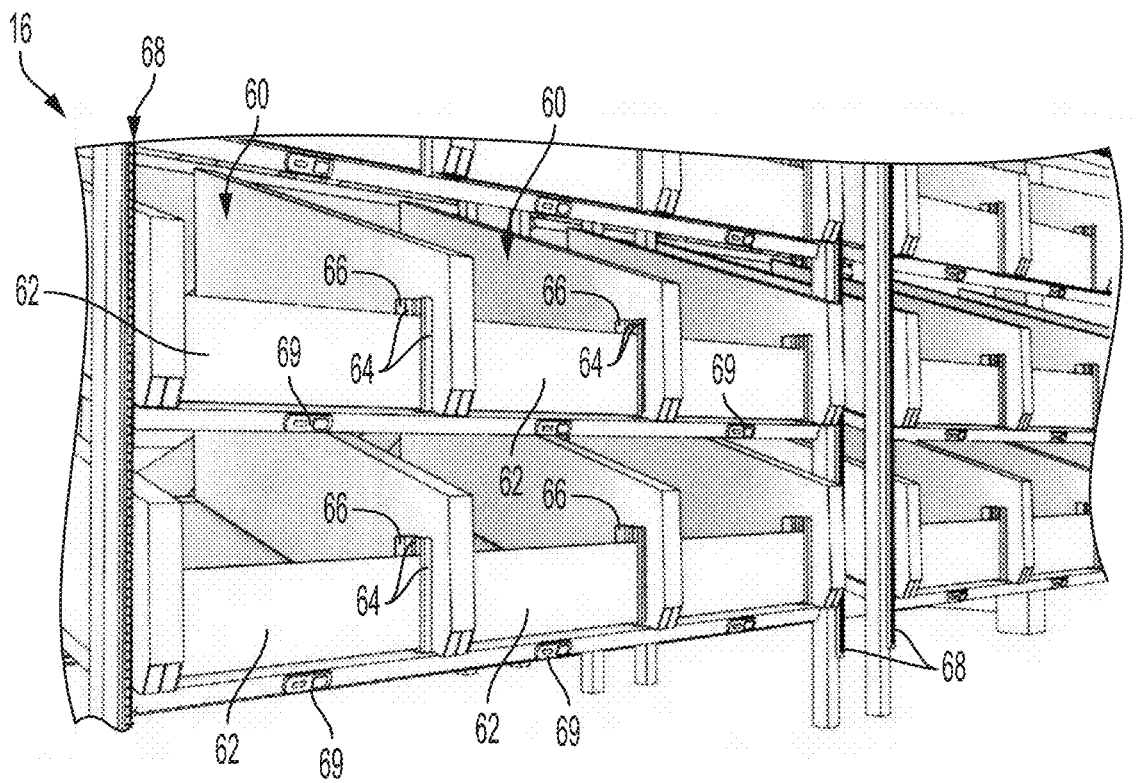
FIGS. 6A and 6B show illustrative diagrammatic views of the destination chute locations exposed ends (FIG. 6A) and a destination container assembly in accordance with an aspect of the invention (FIG. 6B)
Figure 6B:
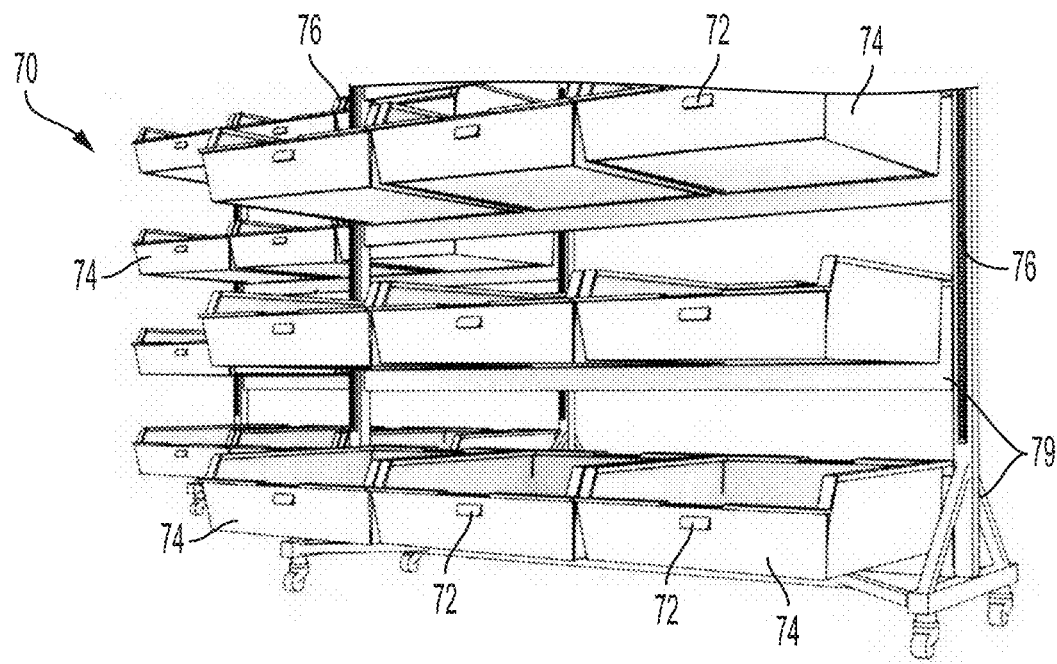

The chute shelving of the arrays of chute locations 16, 18 may include inclined chutes (as shown in more detail in FIG. 6A) and may be designed to interface with the gantry frame of mobile destination container assemblies (as shown in FIG. 6B). The chutes are inclined to encourage gravity flow of deposited items toward the front (packout) side of the chutes. The array chute locations 16 includes chutes 60 that each include an inclined area with a door 62 at the lower end thereof. Each door 62 may ride along tracks 64 and may include an actuator to open the door (by being raised) by an actuator 66 when a mobile destination container is presented at the other side of the door 62. The processing system 14 also includes emitters 68 (e.g., infrared emitters) that cooperate with detectors or reflectors (e.g., 76) on each mobile destination container assembly (e.g., 70) to not only detect the presence of the mobile destination container assembly, but also to provide a safety curtain between the system 14 and the assembly 70. Further emitter and detector pairs are provided as shown at 69 associated with each individual chute 60. The emitter detector pairs 69 cooperate with each associated mobile destination container 74 by reflecting off of reflectors 72 on each container. When a set of containers is rolled away, the reflector on the adjacent cart takes over the role of the reflector in forming a safety light curtain. This effectively creates a light curtain that expands to cover the open portion of the system 14 as carts are removed (in a contiguous sequence).

Figure 7A:
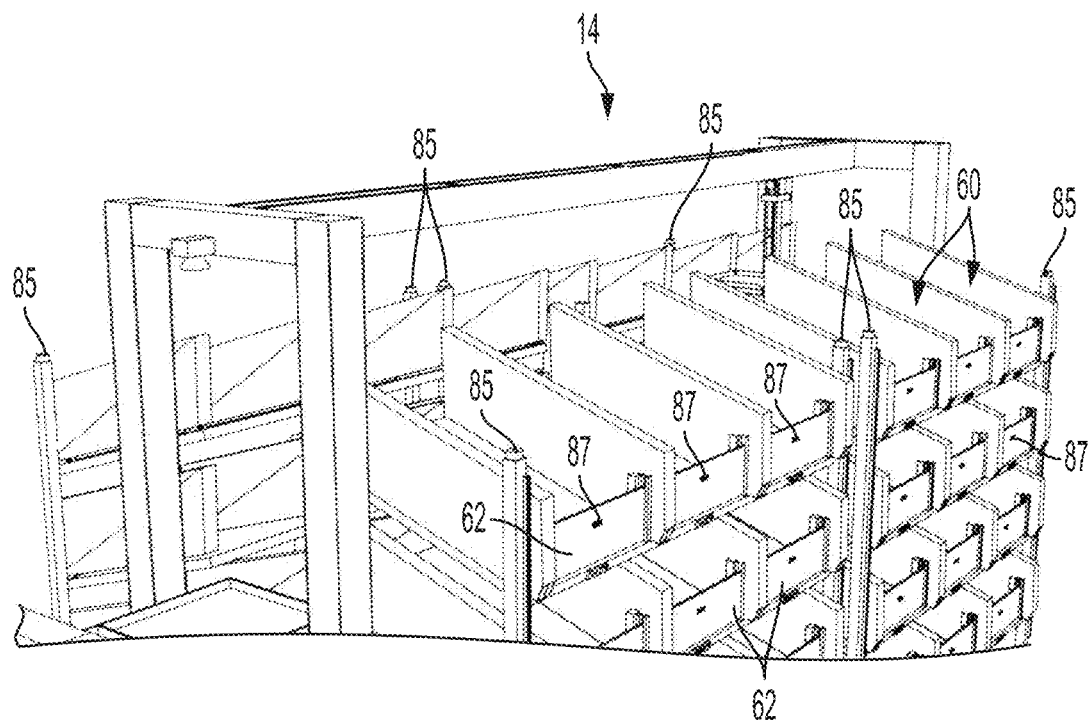
FIGS. 7A and 7B show illustrative diagrammatic views of identification and communication systems in connection with the destination chute locations (FIG. 7A) and the destination container assembly of FIG. 6B (FIG. 7B)
Figure 7B:
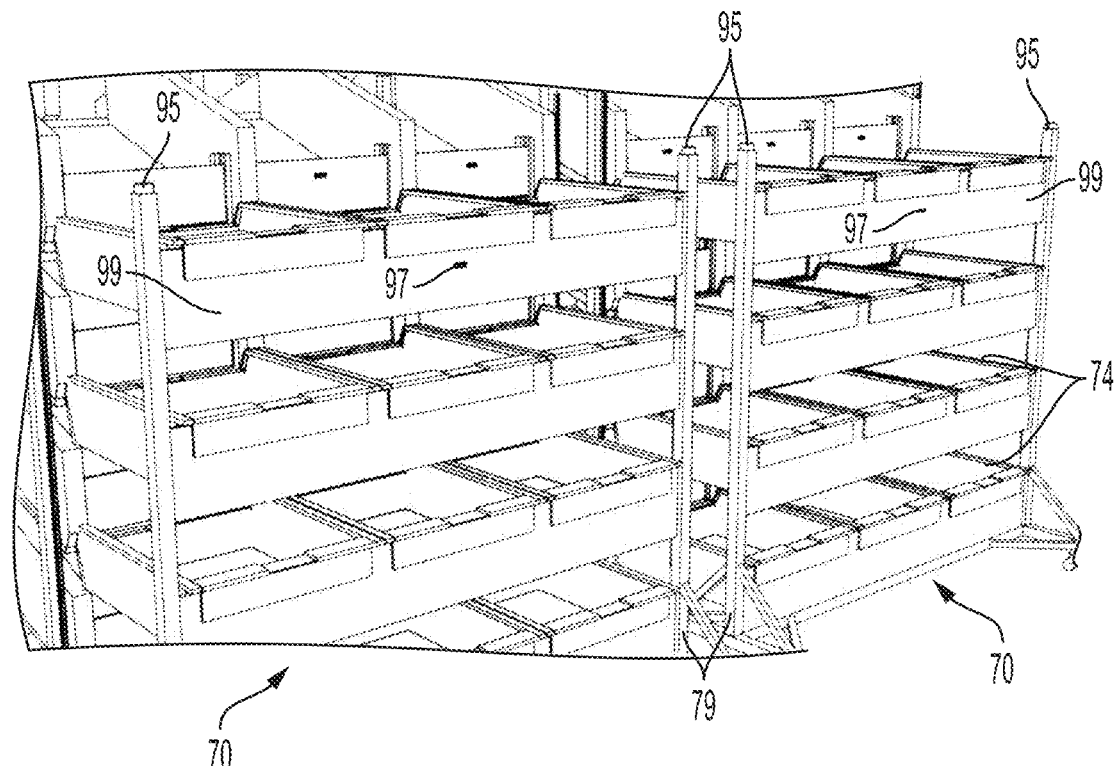

In accordance with further aspects, the mobile shelves may provide a pack-out station for e-commerce, wherein human personnel removes objects from each chute and puts the objects into a single shipping container (e.g., a box) for an e-commerce order. In this workflow, barcodes are provided on each chute that the human personnel will scan when objects are removed from each chute. This will then cause a pack-out station printer to print out an order sheet with a barcode label to be attached to the shipping container, all corresponding to the e-commerce order attached to the chute. Further, before the shelf is removed from the put-wall, a light (e.g., status light) may be turned off or on or change color indicating that the mobile shelf order is complete (all chutes have been filled with all outstanding orders). FIG. 7A shows the system 14 with status indicator lights 85 that indicate the status of each associated section of the system 14. The identification codes (e.g., barcodes) 87 are provided on the doors 62 of each chute 60. FIG. 7B shows assemblies 70 that also includes status indicator lights 95 (again that may turn on/off/change color) to indicate the status of the processing of each assembly 70. The identification codes (e.g., barcodes) 97 are provided on a cross-member 99 of each mobile shelf assembly 70. In accordance with further aspects the invention, the control system maintains status and location data regarding which mobile shelf assembly is attached to which put-wall at all times, and data regarding what order each contain. The mobile shelf assembly itself includes the identification code 97 that is scanned locally at the shelf location to establish or confirm which shelf assembly is attached to which put-wall section such that orders may be assigned thereto. In accordance with further aspects, the assignment of orders may be dynamic, depending on a variety of factors such as for example object frequency, object weight (chutes closer to the input area are chosen), and order destination location.

Figure 8A:
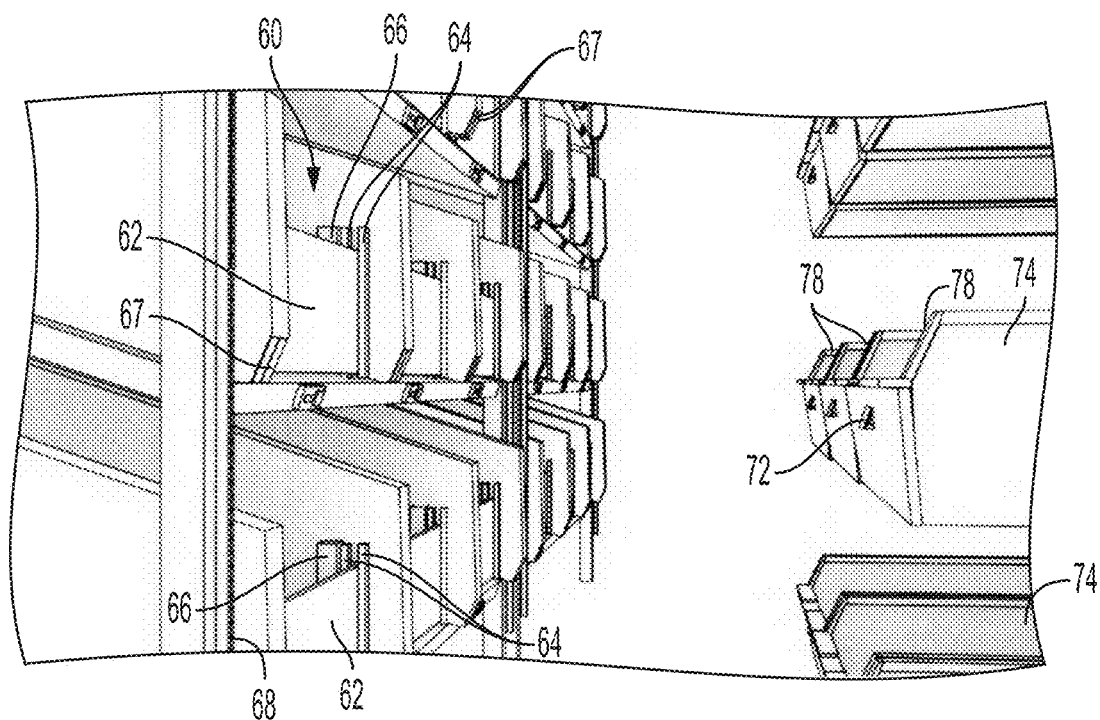
FIGS. 8A and 8B show illustrative diagrammatic views of the destination container assembly of FIG. 7B approaching the destination chute locations of FIG. 7A (FIG. 8A), and showing the destination container assembly of FIG. 7B engaging the destination chute locations of FIG. 7A (FIG. 8B)
Figure 8B:
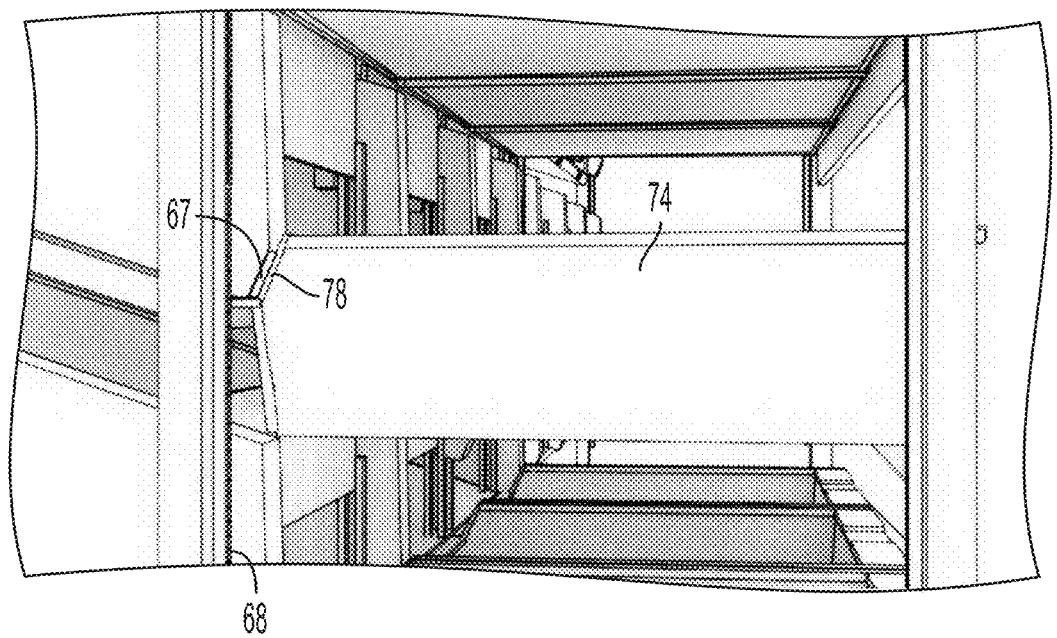

With reference to FIGS. 8A and 8B, the mobile destination container assembly 70 includes magnetic sensor materials 78 on each destination container 74, such that when docked with the system 14, magnetic sensors 67 associated with each chute 60 register that the containers 74 are present, permitting the doors 62 to open. The system may therefore confirm that a destination container assembly is docked and may further register which destination container assembly is docked at which bay of which put-wall system. FIG. 8A shows the destination container assembly nearing the put-wall system, and FIG. 8B shows the destination container system docked with the put-wall system. The destination containers may include bins that hang from cross beams on the wheeled structure 79. Following loading the mobile destination container assembly 70 may then be moved about freely by human personnel or may be moved via programmable motion devices.

Figure 9:
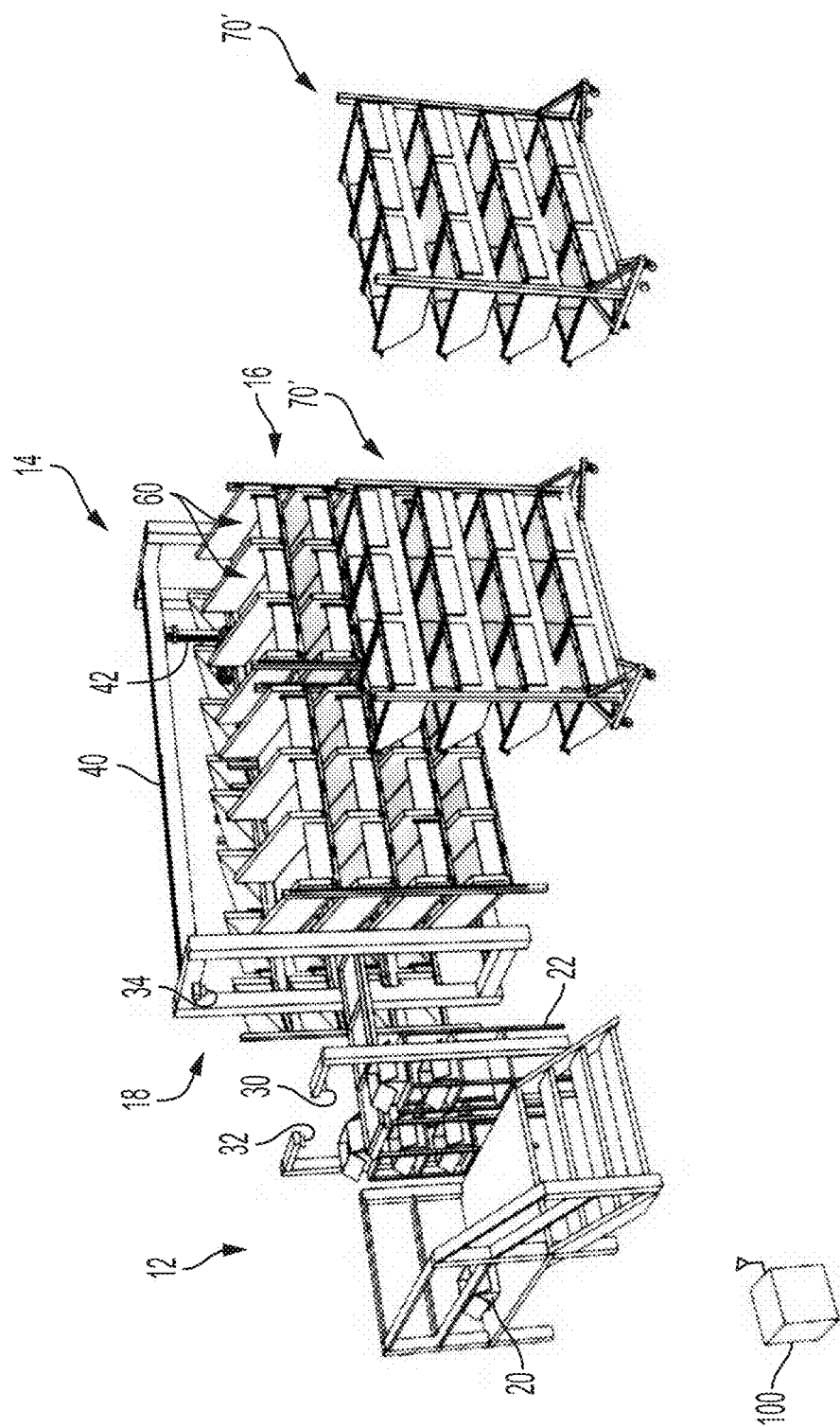
FIG. 9 shows an illustrative diagrammatic view of a system in accordance with another aspect of the present invention that includes a destination container assembly with flexible destination bins.
Figure 10:
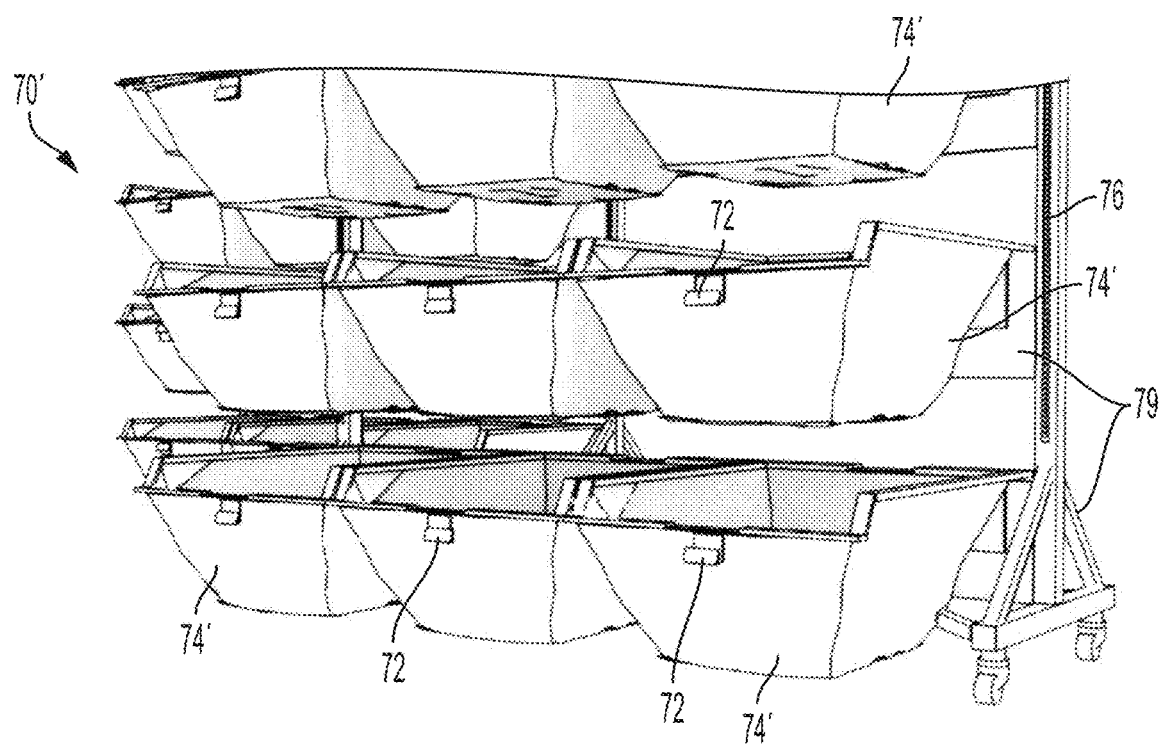
FIG. 10 shows an illustrative diagrammatic view of the destination container assembly of FIG. 9 showing the flexible destination bins.
Figure 11:
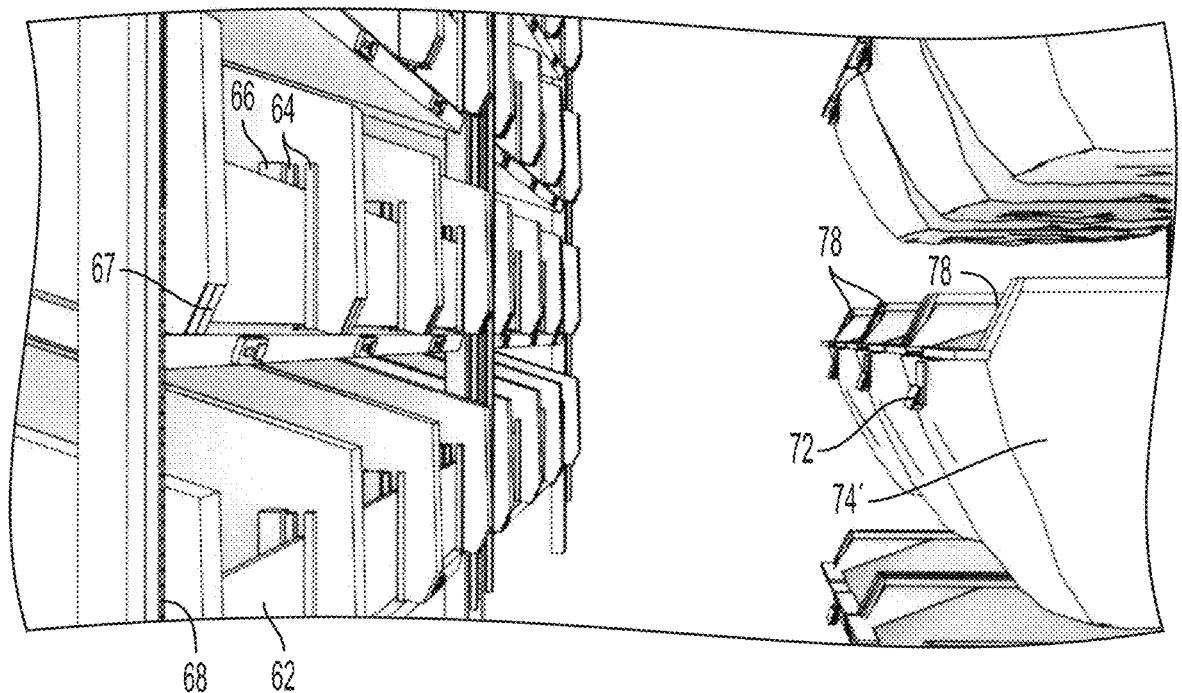
FIG. 11 shows an illustrative diagrammatic view of the destination container assembly of FIG. 9 approaching the destination chute locations.

In accordance with various aspects, the chute locations lead to any of a variety of mobile destination locations. FIG. 9 shows a system in which the chutes lead to mobile destination container assembly 70' that include flexible containers 74' (e.g., bags) that are suspended from arms on the wheeled structure 79. The same types of sensors (light, infrared, magnetic, etc.) are used in the system of FIG. 9. FIG. 10 shows the mobile destination location assembly 70' with the reflectors 72 and 76. Again, magnetic coupling (67, 78 as shown in FIG. 11) between each destination container and each chute.

Figure 12:
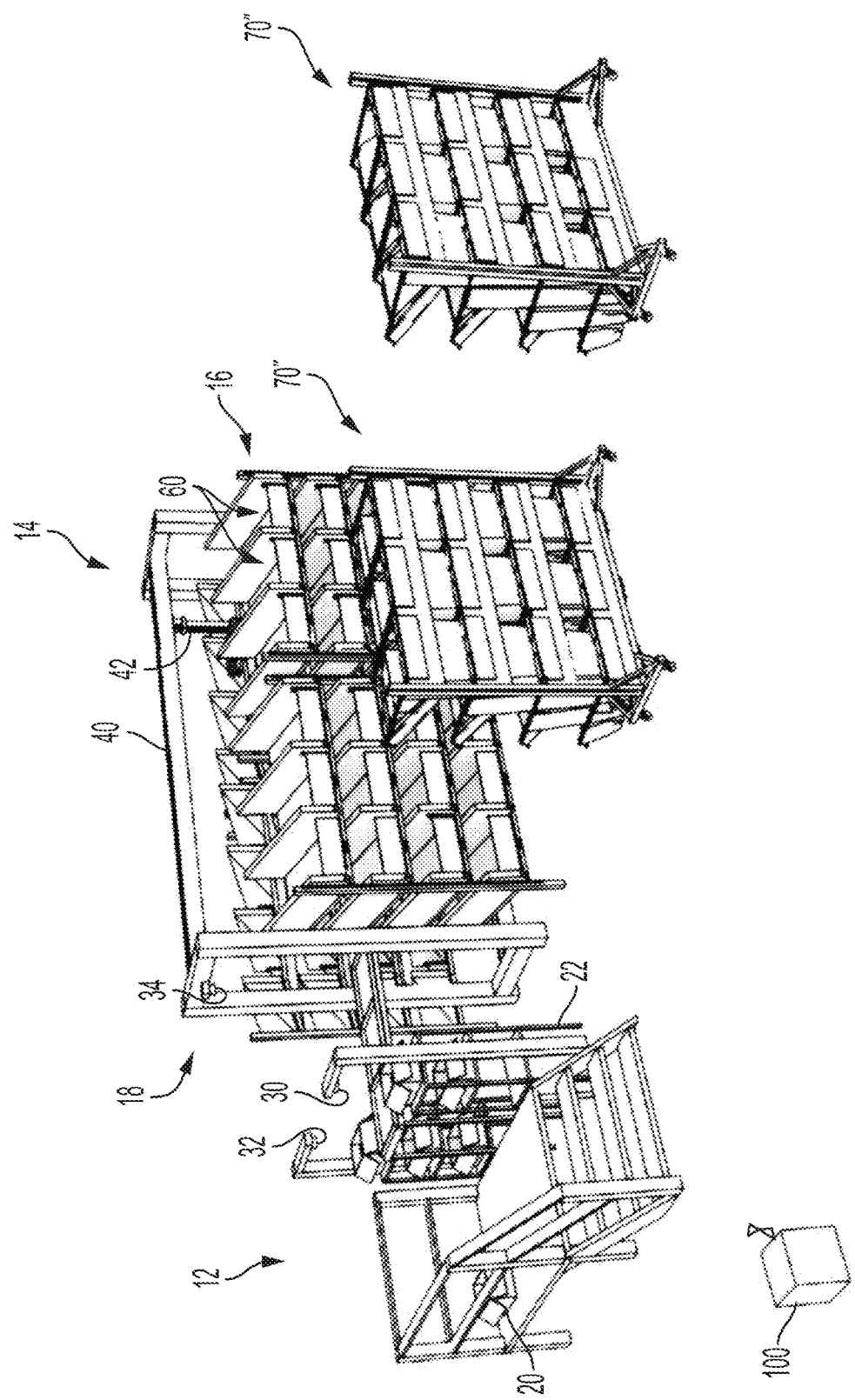
FIG. 12 shows an illustrative diagrammatic view of a system in accordance with another aspect of the present invention that includes a destination container assembly with flexible extended destination bins.
Figure 13:
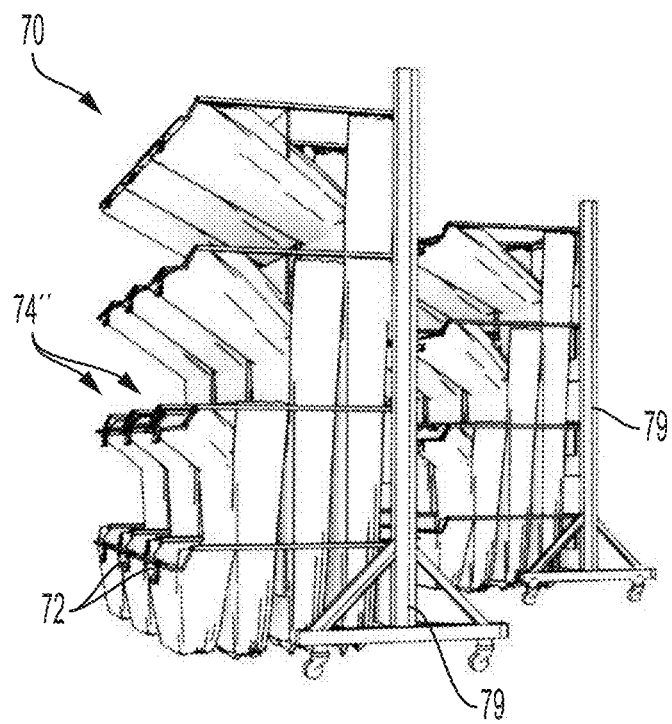
FIG. 13 shows an illustrative diagrammatic view of the destination container assembly of FIG. 12 showing the flexible extended destination bins.
Figure 14:
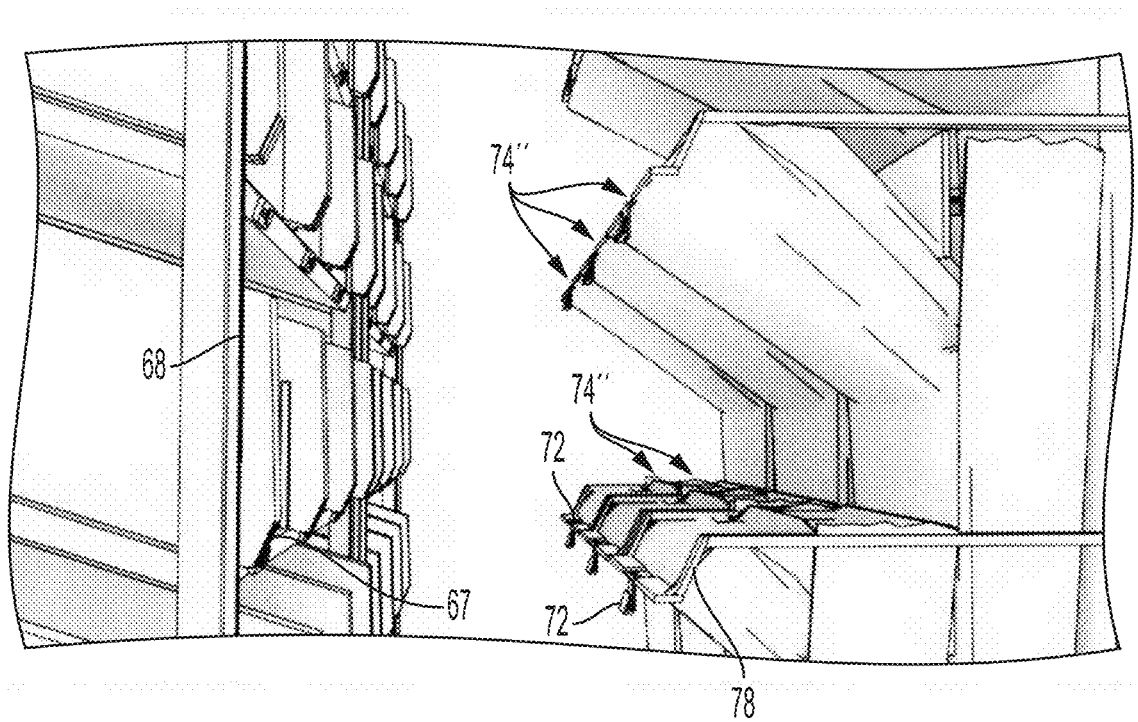
FIG. 14 shows an illustrative diagrammatic view of the destination container assembly of FIG. 10 approaching the destination chute locations.

In accordance with further aspects, the destination containers 70" may be formed of different sizes (vertically) such that destinations that are expected to receive a large number of objects may be assigned to use the larger containers. FIG. 12 shows a system in which the chutes lead to mobile destination container assembly 70" that include variable sized flexible containers 74" (e.g., bags) that are suspended from arms on the wheeled structure 79, and may include funnel openings. The same types of sensors (light, infrared, magnetic, etc.) are used in the system of FIG. 9. FIG. 13 shows the mobile destination location assembly 70' with the reflectors 72 and 76. Again, magnetic coupling (67, 78 as shown in FIG. 14) between each destination container and each chute. The variable sized flexible containers 74" may be sealable for transport, e.g., by automated or manual draw cords.

Figure 15:
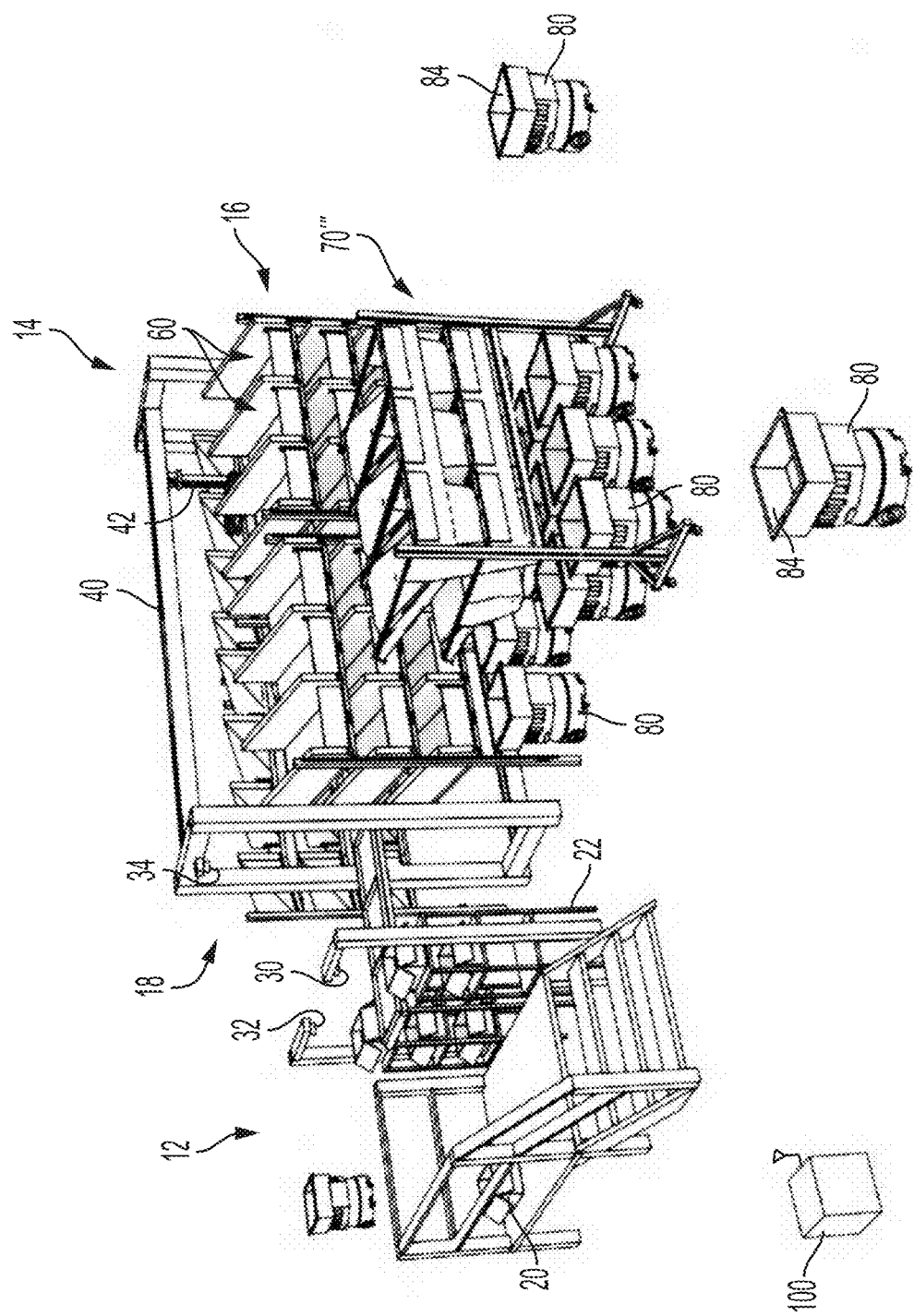
FIG. 15 shows an illustrative diagrammatic view of a system in accordance with another aspect of the present invention that includes a destination container assembly with flexible extended destination cutes leading to bins on mobile carrier units.
Figure 16:
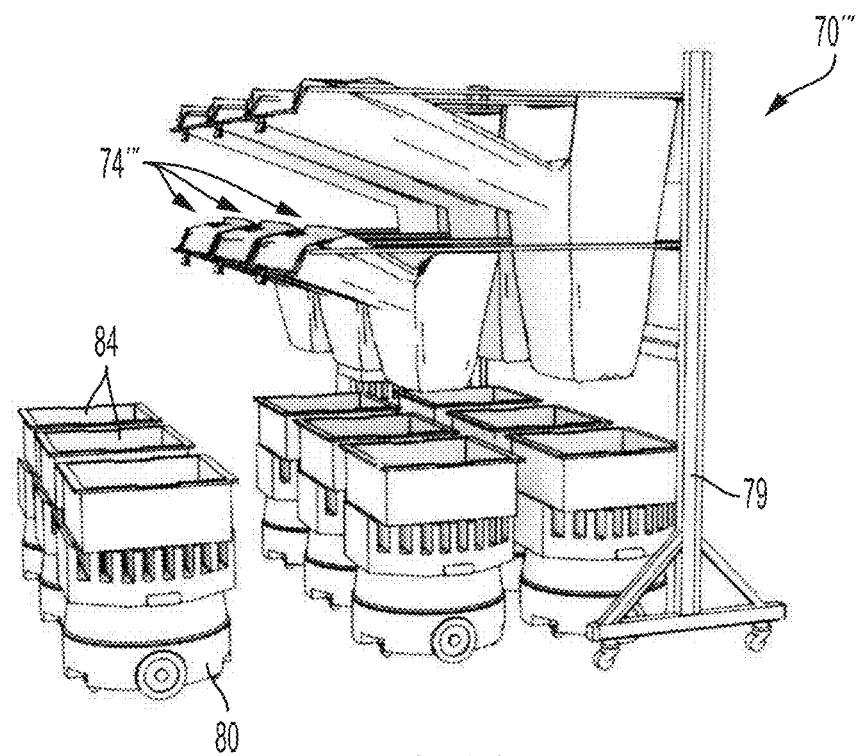
FIG. 16 shows an illustrative diagrammatic view of the destination container assembly of FIG. 15 showing the flexible extended destination bins leading to the bins on the mobile carrier units.
Figure 17:
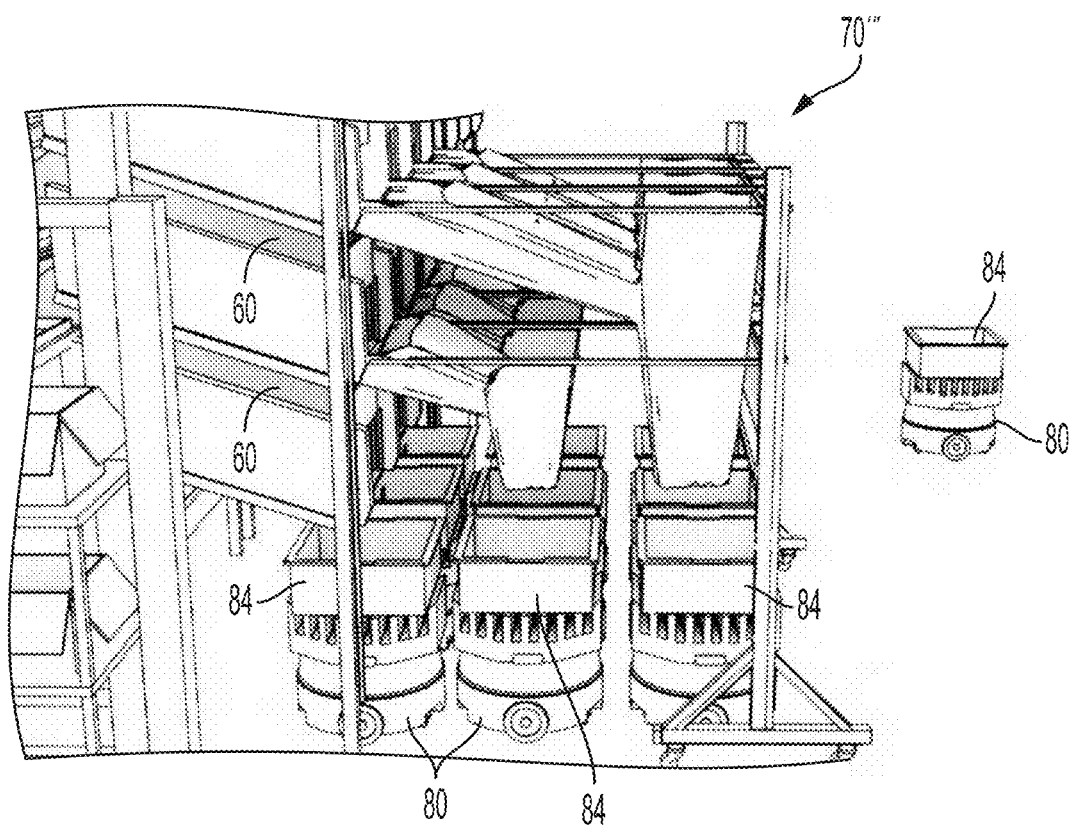
FIG. 17 shows an illustrative diagrammatic view of the destination container assembly of FIG. 15 engaging the destination chute locations.

In accordance with yet a further aspect, a mobile destination location assembly 70''' may include channels that lead to bins 84 on mobile programmable motion devices 80 as shown in FIG. 15. The mobile devices 80 may move about the environment, positioning themselves below chutes 60 as needed, and moving containers 84 thereon to and from the put-wall system and destination container assemblies as needed. As shown in FIG. 16, the mobile programmable motion devices may be moved to be positioned under a designated chute, and in further aspects, the chutes may be closed, and opened only when a mobile device is positioned below the chute. Some devices 80 may be positioned below the chutes 60, while others are positioned below chutes on the wheeled structure 79, which receive objects from chutes 60 of the processing system 40 as shown in FIG. 17. In accordance with various aspects, the containers 74' and chutes 74''' may be formed of flexible material. The chutes 60 may also be formed of flexible material, permitting the chutes and containers to be collapsed for transit, and again may be sealed by manual or automated mechanisms.

Figure 18:
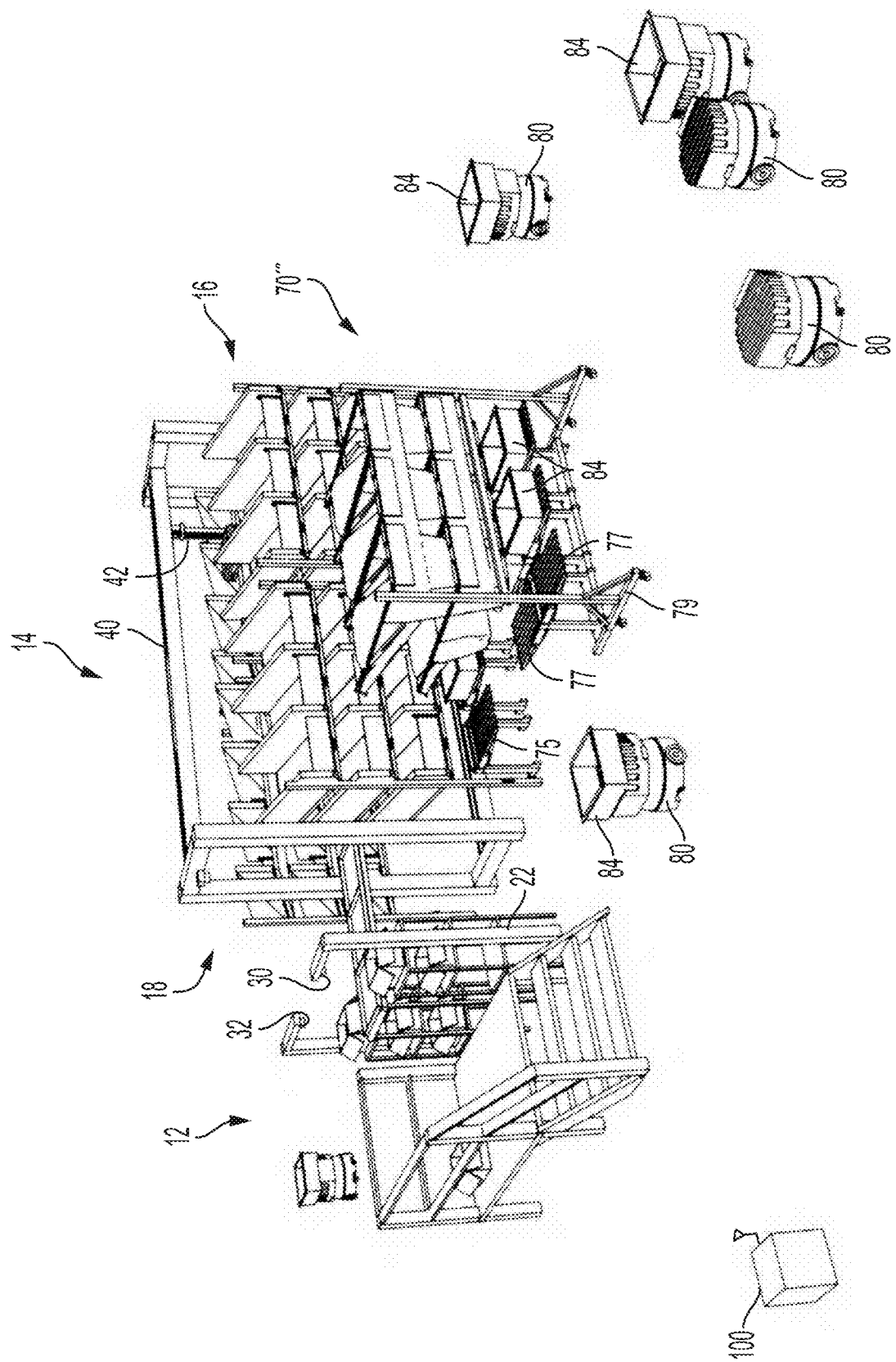
FIG. 18 shows an illustrative diagrammatic view of a system in accordance with another aspect of the present invention that includes a destination container assembly with flexible extended destination chutes leading to bins on shelves to be accessed by mobile carrier units.
Figure 19:
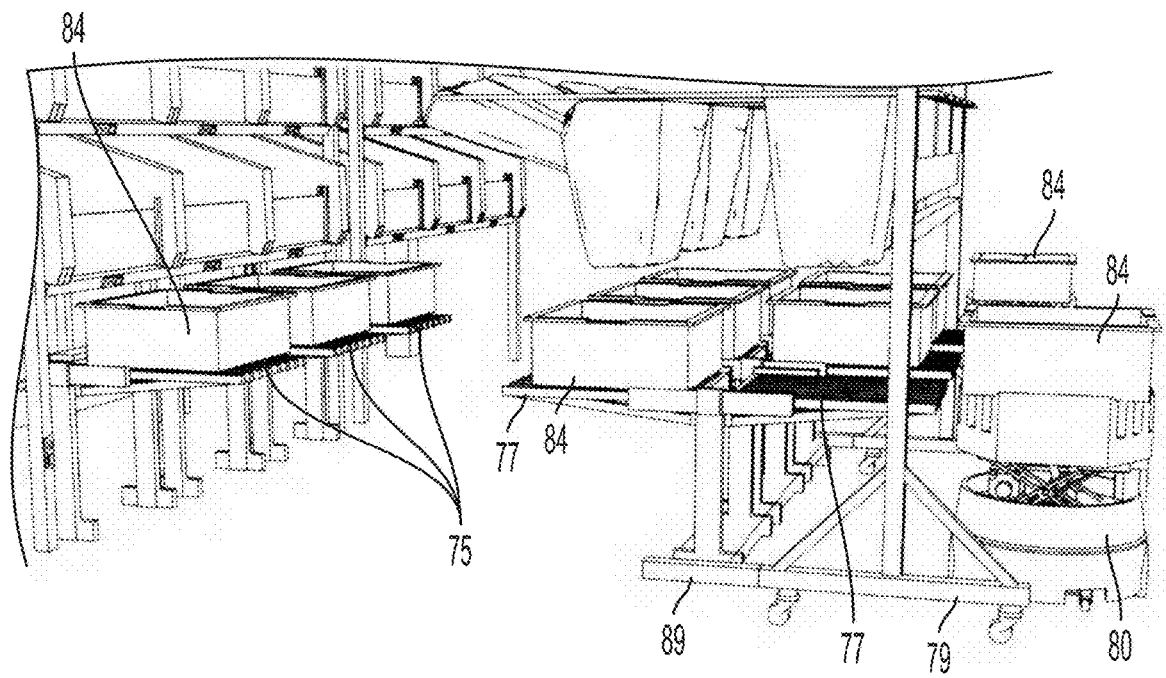
FIG. 19 shows an illustrative diagrammatic view of the destination container assembly of FIG. 18 approaching the destination chute locations and a mobile carrier unit approaching the destination container assembly.
Figure 20:
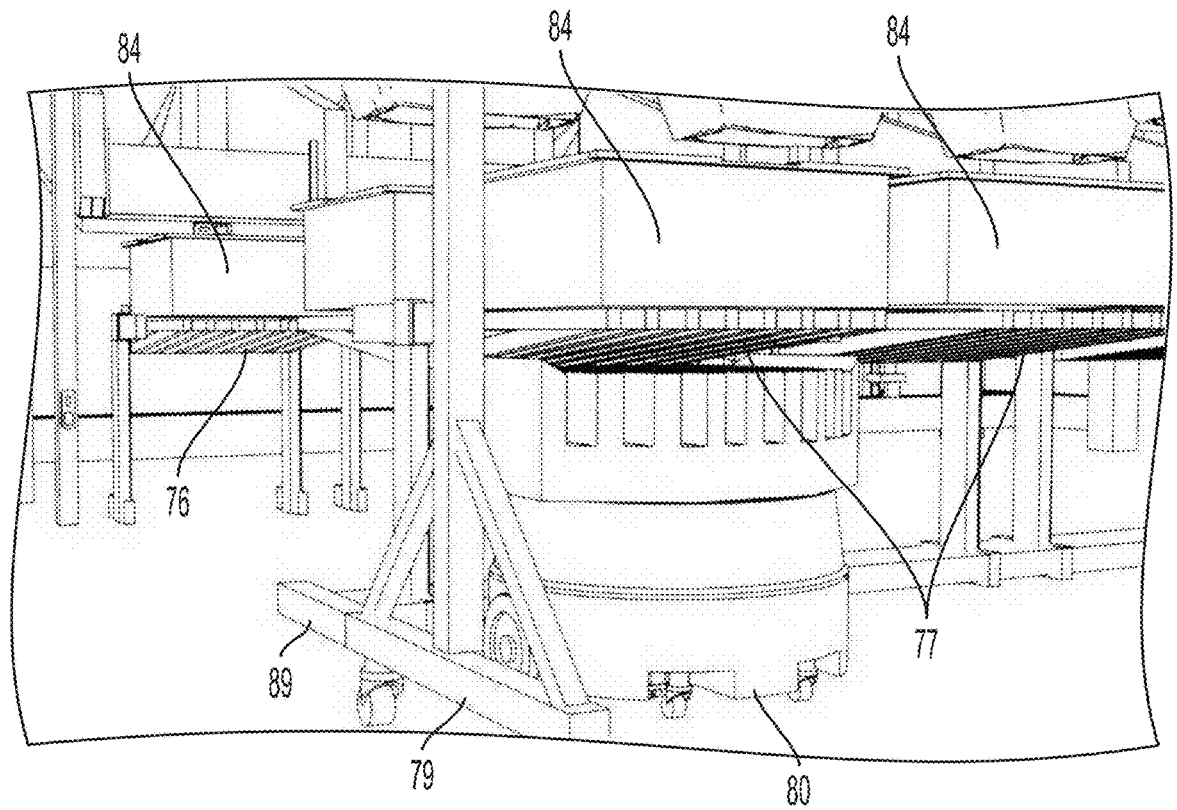
FIG. 20 shows an illustrative diagrammatic view of the destination container assembly of FIG. 18 showing the flexible extended destination bins leading to the bins on the shelves for access by the mobile carrier units showing the mobile carrier unit depositing the container onto the shelf.

With reference to FIG. 18, in accordance with a further aspect, the mobile destination location assembly 70''' may include channels that lead to bins 84 on selves 75, 77 wherein the shelves 75, 77 may be accessible by mobile programmable motion devices 80. The shelves 85 may be positioned below the destination location chutes 60, while the shelves 77 may be attached to and supported by an extension 89 on the assembly frame 79. The shelves 77 are therefore movable with the assemblies 70 toward and away from the put-wall system. With further reference to FIG. 19, each mobile device programmable motion device 80 may include an elevator system for raising its payload (as shown in FIG. 19) to move a bin 72 onto a shelf, and as shown in FIG. 20, the bin is deposited onto the shelf when the elevator system of the mobile device 80 is lowered when under the shelf 77 to thereby deposit a bin 72 onto the shelf 77. The process of lifting a bin off of the shelf 85, 787 and removing the bin from the shelf involves the opposite process of positioning the mobile device under the shelf and bin, raising the payload, to lift the bin, and moving the mobile device and elevated payload away from the shelf 75, 77.

Figure 21:
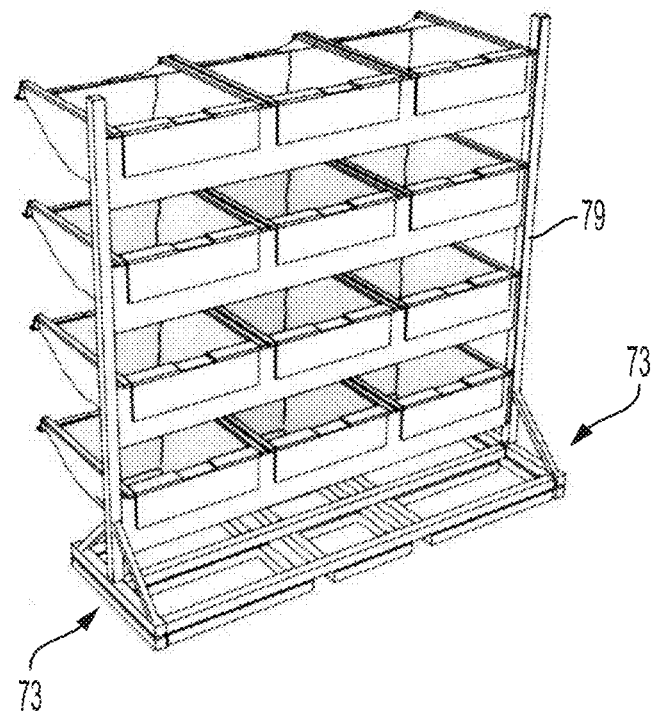
FIG. 21 shows an illustrative diagrammatic view of a destination container assembly in accordance with another aspect of the present invention that includes a liftable frame.
Figure 22:
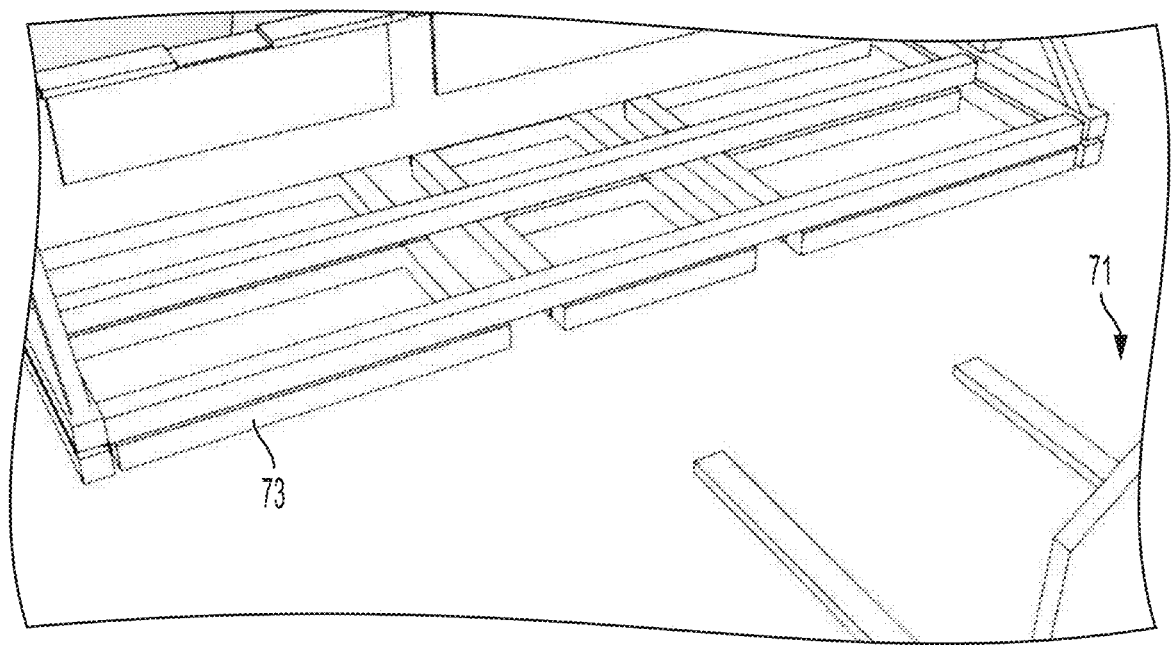
FIG. 22 shows an illustrative diagrammatic view of a lower portion of the destination container assembly of FIG. 21 showing the lift engagement structure.
Figure 23A:
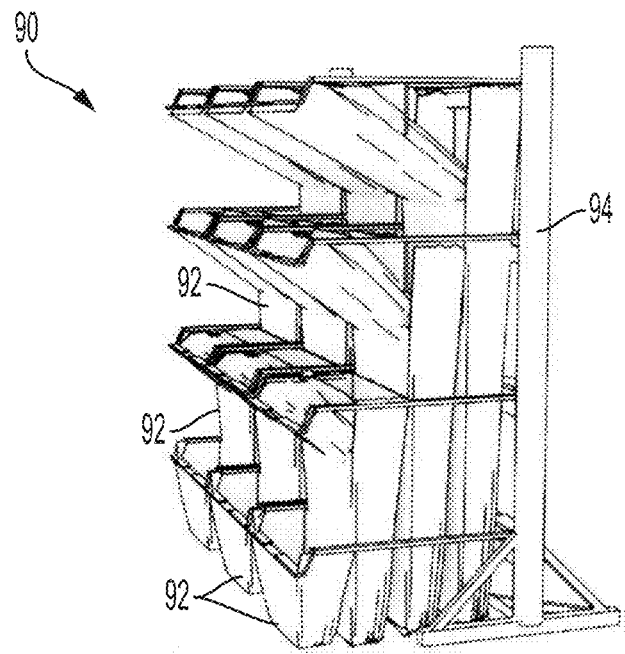
FIGS. 23A and 23B show illustrative diagrammatic views of a destination container assembly including flexible extended destination bins that are collapsible (FIG. 23A) and showing the flexible extended destination bins collapsed (FIG. 23B)
Figure 23B:
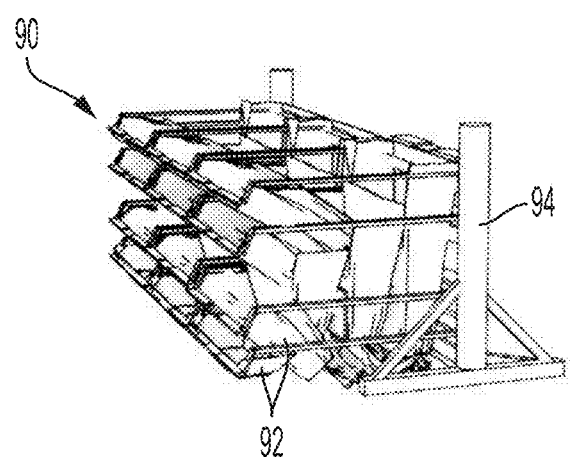

Any of the above discussed assemblies (e.g., 79) may further be formed with a lifting base 73 that permits forks 71 (e.g., of a fork-lift) to move the assembly as shown in FIGS. 21 and 22. FIG. 21 shows a destination container assembly with a lifting base 73, and FIG. 22 shows an enlarged view of the lifting base 73 as well a portion of a fork lift system 71 for lifting and moving the destination container assembly via the base 73. Additionally, as noted above, the containers may be flexible. FIG. 23A shows a mobile destination assembly 90 that includes flexible containers 92, wherein the structure is provided on collapsible columns 94. When the columns 94 are collapsed (as shown in FIG. 23B), the flexible containers collapse with the columns and thereafter occupy less volume for transit. Once collapsed, the flexible containers may, for example, be self-sealed via a draw mechanism or may be manually sealed.

Figure 24:
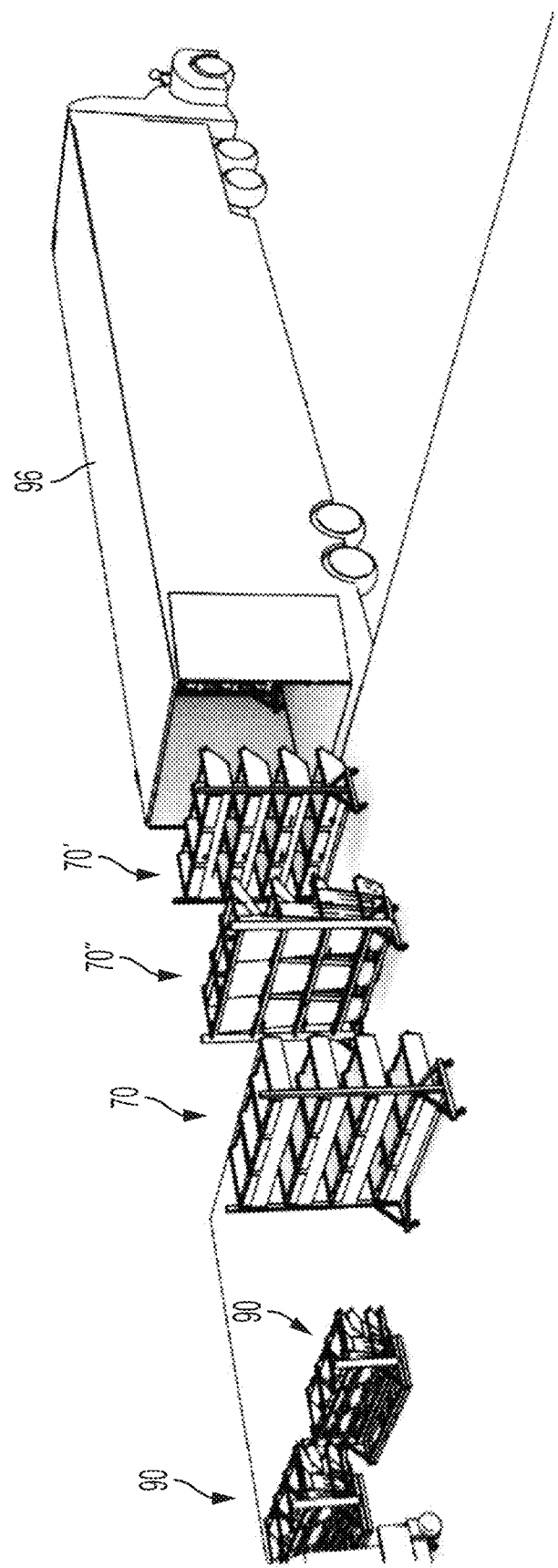
FIG. 24 shows an illustrative diagrammatic view of destination container assemblies in accordance with various aspects of the present invention being loaded onto a trailer of a tractor trailer.

FIG. 24 shows mobile destination containers (e.g., 70, 70', 70", 90) being loaded onto a vehicle trailer 96, and assemblies 90 may be stacked prior to loading as shown. In accordance with various aspects, objects may be loaded into mobile destination locations that correspond to specific locations (e.g., aisles) at a distribution site such as a retail store. Each destination container includes a code (e.g., barcode, QR code, RFID, etc.) that associates with a specific aisle and even shelf location at the distribution site. The mobile programmable motion devices may also be moved through a distribution site, and/or onto trailers).

At the designated site (e.g., retail store), the mobile destination container assemblies (e.g., carts) are unloaded (e.g., in sequence of distribution within the site). Lights on each cart are illuminated when present at the assigned aisle (or a connected scanner may scan an aisle marker). Within each aisle, when a shelf location is scanned, a corresponding container on the cart may include a light that is illuminated (e.g., pick-from-light system), and the human personnel may place objects in that container at the scanned shelf location.

Those skilled in the art will appreciate that numerous modifications and variations may be made to the above disclosed embodiments without departing from the spirit and scope of the present invention.

What is claimed is:

1. An object processing system comprising:
    an object induction station at which objects are provided for processing, said object induction station including at least one perception unit for providing perception data regarding an object of said objects; and
    an object sortation system comprising a two dimensional gantry carrier for receiving the objects from the object induction station, and for urging the object of said objects into a first end of one of a plurality of chute locations using the perception data, each of the plurality of chute locations including a first end that is accessible by the two dimensional gantry carrier and a second end that is accessible by a mobile destination container assembly of a plurality of mobile destination containers.

2. The object processing system as claimed in claim 1, wherein the plurality of mobile destination containers are provided as a vertical array of containers.

3. The object processing system as claimed in claim 1, wherein the plurality of mobile destination containers are formed of a flexible material.

4. The object processing system as claimed in claim 1, wherein the plurality of mobile destination containers include chutes on a wheeled structure.

5. The object processing system as claimed in claim 4, wherein the chutes lead to bins.

6. The object processing system as claimed in claim 4, wherein the chutes lead to mobile programmable motion devices.

7. The object processing system as claimed in claim 1, wherein each mobile destination container assembly has objects in mobile destination containers that are assigned to an aisle of a destination site.

8. The object processing system as claimed in claim 1, wherein each mobile destination container assembly is sized to occupy a width of a trailer of a tractor trailer.

9. The object processing system as claimed in claim 8, wherein the mobile destination container assembly is collapsible.

10. The object processing system as claimed in claim 1, wherein presence of the mobile destination container assembly adjacent the object sortation system causes doors associated with each of the plurality of chute locations of the object processing system to open.

11. An object processing system comprising:
an object induction station at which objects are provided for processing at a processing station, said object induction station including at least one perception unit for providing perception data regarding an object;
an object sortation system comprising a two dimensional gantry carrier for receiving objects from the object induction station, and for providing objects to one of a plurality of chute locations; and
a mobile destination location assembly for positioning adjacent the sortation system, each of which includes a mobile destination container assembly of a plurality of mobile destination containers for receiving objects from the plurality of chute locations.

12. The object processing system as claimed in claim 11, wherein the plurality of mobile destination containers are provided as a vertical array of containers.

13. The object processing system as claimed in claim 11, wherein the plurality of mobile destination containers are formed of a flexible material.

14. The object processing system as claimed in claim 11, wherein the plurality of mobile destination containers include chutes on a wheeled structure.

15. The object processing system as claimed in claim 14, wherein the chutes lead to bins.

16. The object processing system as claimed in claim 14, wherein the chutes lead to mobile programmable motion devices.

17. The object processing system as claimed in claim 11, wherein each mobile destination container assembly has objects in mobile destination containers that are assigned to an aisle of a destination site.

18. The object processing system as claimed in claim 11, wherein each mobile destination container assembly is sized to occupy a width of a trailer of a tractor trailer.

19. The object processing system as claimed in claim 18, wherein the mobile destination container assembly is collapsible.

20. The object processing system as claimed in claim 11, wherein presence of the mobile destination container assembly adjacent the processing system causes doors associated with each chute location of the processing system to open.

21. A method of processing objects comprising:
providing objects for processing at an object induction station, said object induction station including at least one perception unit for providing perception data regarding each of said objects;
receiving the objects from the object induction station at an object processing station comprising a two dimensional gantry carrier;
providing the objects to one of a plurality of chute locations; and
positioning a mobile destination location assembly adjacent the object processing station, each of which includes a mobile destination container of a plurality of mobile destination containers for receiving the objects from the plurality of chute locations.

* * * * *